(12) United States Patent  
Usman et al.

(10) Patent No.: US 12,502,470 B2  
(45) Date of Patent: Dec. 23, 2025

(54) DAMPING DEVICES, INCLUDING DAMPING DEVICES FOR AUTOMATED PERITONEAL DIALYSIS SYSTEMS, AND ASSOCIATED SYSTEMS, DEVICES, AND METHODS

(71) Applicant: Byonyks Medical Devices, Inc., Itasca, IL (US)

(72) Inventors: Farrukh Usman, Chatham, NY (US); Michael Wollowitz, Chatham, NY (US); Naveed Iftikhar, Lahore (PK); Abdul Qadeer, Lahore (PK); Faisal Bashir, Lahore (PK); Salar Toor, Lahore (PK)

(73) Assignee: Byonyks Medical Devices, Inc., Itasca, IL (US)

( * ) Notice: Subject to any disclaimer, the term of this patent is extended or adjusted under 35 U.S.C. 154(b) by 531 days.

(21) Appl. No.: 17/996,052

(22) PCT Filed: Apr. 15, 2021

(86) PCT No.: PCT/US2021/027428  
§ 371 (c)(1),  
(2) Date: Oct. 12, 2022

(87) PCT Pub. No.: WO2021/211803  
PCT Pub. Date: Oct. 21, 2021

(65) Prior Publication Data  
US 2023/0218808 A1    Jul. 13, 2023

Related U.S. Application Data

(60) Provisional application No. 63/010,052, filed on Apr. 15, 2020.

(51) Int. Cl.  
*A61M 1/28*    (2006.01)  
*A61M 1/14*    (2006.01)

(52) U.S. Cl.  
CPC .............. *A61M 1/282* (2014.02); *A61M 1/15* (2022.05); *A61M 1/159* (2022.05); *A61M 1/281* (2014.02); *A61M 2205/123* (2013.01)

(58) Field of Classification Search  
CPC ........ A61M 1/15; A61M 1/159; A61M 1/281; A61M 1/282; A61M 2205/123  
See application file for complete search history.

(56) References Cited

U.S. PATENT DOCUMENTS

| 2,474,512 | A | 6/1949 | Bechtold et al. |
| 3,818,934 | A | 6/1974 | Borsanyi |

(Continued)

FOREIGN PATENT DOCUMENTS

| DE | 202016101495 U1 | 6/2017 |
| EP | 0157024 | 10/1985 |

(Continued)

OTHER PUBLICATIONS

Notification of Transmittal of the International Search Report and the Written Opinion of the International Searching Authority, or the Declaration dated Aug. 5, 2021 for International Patent Application No. PCT/US2021/027428.

(Continued)

*Primary Examiner* — John Kim  
(74) *Attorney, Agent, or Firm* — McDonnell Boehnen Hulbert & Berghoff LLP

(57) ABSTRACT

Damping devices, including damping devices for automated peritoneal dialysis (APD) systems, and associated systems, devices, and methods are disclosed herein. In one embodiment, a damping device includes a body portion, a first membrane, and a second membrane. The body portion can include a first side, a second side opposite the first side, an inlet, and a cavity fluidly coupled to the inlet. The cavity can be defined at least in part by a lumen in the body portion (Continued)

extending from the first side to the second side. The first membrane can be affixed to the first side of the body portion such that the first membrane hermetically seals the cavity at the first side. The second membrane can be affixed to the second side of the body portion such that the second membrane hermetically seals the cavity at the second side.

12 Claims, 10 Drawing Sheets

(56) References Cited

U.S. PATENT DOCUMENTS

| | | | |
|---|---|---|---|
| 5,030,973 A * | 7/1991 | Nonoyama | B41J 2/17563 347/93 |
| 5,350,357 A | 9/1994 | Kamen et al. | |
| 5,628,908 A | 5/1997 | Kamen et al. | |
| 10,330,234 B1 | 6/2019 | Geschwender | |
| 2009/0131859 A1 | 5/2009 | DelCastillo et al. | |
| 2010/0018923 A1 | 1/2010 | Rohde et al. | |
| 2011/0196303 A1 | 8/2011 | Chan et al. | |
| 2013/0131582 A1 | 5/2013 | Childers et al. | |
| 2013/0167941 A1 | 7/2013 | Bartlett | |
| 2014/0364800 A1 | 12/2014 | McGill et al. | |
| 2015/0129481 A1 | 5/2015 | Higgitt et al. | |
| 2016/0106903 A1 | 4/2016 | Nilsson et al. | |
| 2016/0184501 A1 | 6/2016 | Kreber et al. | |
| 2019/0316948 A1 | 10/2019 | Karol et al. | |

FOREIGN PATENT DOCUMENTS

| | | |
|---|---|---|
| WO | 95/20985 A1 | 8/1995 |
| WO | 2008/106452 A1 | 9/2008 |
| WO | 2022027036 A1 | 2/2022 |
| WO | 2022040325 A1 | 2/2022 |
| WO | 2022040597 A1 | 2/2022 |
| WO | 2022040601 A1 | 2/2022 |
| WO | 2022051456 A1 | 3/2022 |

OTHER PUBLICATIONS

Extended European Search Report issued in European Application No. 21788584.7 on Jun. 17, 2024, 17 pages.
Partial Supplementary European Search Report issued in European Application No. 21788584.7 on Mar. 25, 2024, 19 pages.

* cited by examiner

DAMPING DEVICES, INCLUDING DAMPING DEVICES FOR AUTOMATED PERITONEAL DIALYSIS SYSTEMS, AND ASSOCIATED SYSTEMS, DEVICES, AND METHODS

CROSS-REFERENCE TO RELATED APPLICATION(S)

This application is a section 371 U.S. national phase of PCT/US2021/027428, filed Apr. 15, 2021, which claims the benefit of U.S. Provisional Patent Application No. 63/010,052, filed Apr. 15, 2020, both which are incorporated by reference herein in their entirety.

TECHNICAL FIELD

The present disclosure is directed to damping devices, including damping devices for automated peritoneal dialysis systems, and associated systems, devices, and methods. For example, the present disclosure is directed to damping devices configured to reduce pressure pulsation amplitudes and/or provide a path for air removal from solution flowing through disposable sets of automated peritoneal dialysis systems.

BACKGROUND

Dialysis is used to (a) remove excess fluid and toxins in persons with kidney failure and (b) correct electrolyte concentrations in their blood. Peritoneal dialysis is a form of dialysis that uses a peritoneum in an individual's abdomen as a membrane through which fluid and dissolved substances are exchanged with blood. More specifically, a solution is introduced into and removed from the individual's abdomen via a surgically installed catheter.

In continuous ambulatory dialysis (CAPD), solution is manually introduced and removed (e.g., at regular intervals throughout the day). In particular, the catheter is connected to a disposable set (also known as a transfer set) that includes (i) a source bag (e.g., hung on a drip stand) containing new solution, (ii) a drain bag configured to collect waste solution, and (iii) various fluid lines connecting the source bag and the drain bag to the catheter. Waste solution from the individual's lower abdomen is drained into the drain bag via the catheter, and new solution is introduced into the individual's lower abdomen via the catheter. After such an exchange treatment is complete, the disposable set is discarded.

Automated peritoneal dialysis (APD) (also known as continuous cycling peritoneal dialysis (CCPD)) is similar to CAPD except that the exchange treatment is automated using an APD machine or cycler. More specifically, a pump included in the APD machine is used to introduce and remove the solution (e.g., while the individual sleeps). Each APD exchange treatment may include one or more cycles of introducing and removing solution from the individual's abdomen.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments depicted but are for explanation and understanding only.

DETAILED DESCRIPTION

Figure 1:
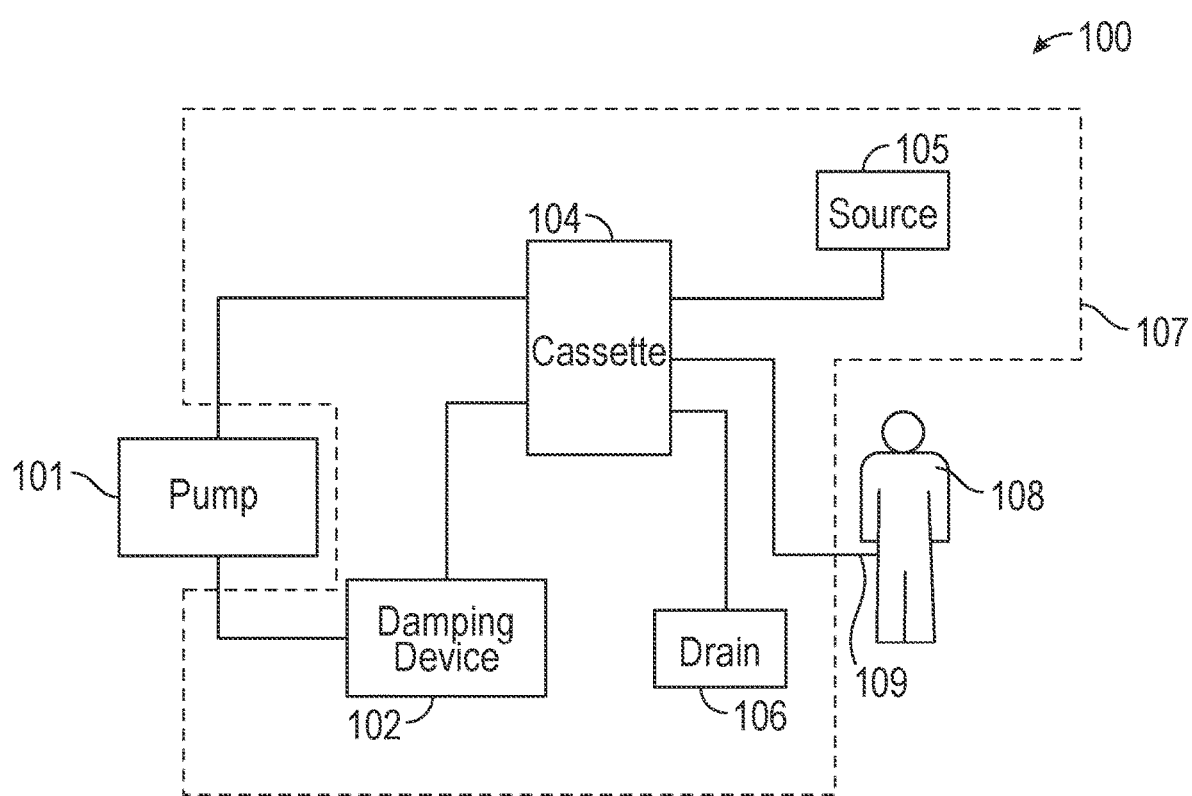
FIG. 1 is a schematic representation of an automated peritoneal dialysis system configured in accordance with various embodiments of the present technology.

The present disclosure is directed to damping devices and associated systems, devices, and methods. In the illustrated embodiments below, damping devices of the present technology are primarily described in the context of reducing amplitudes of pressure pulsations in dialysate solution flowing through APD systems. Damping devices configured in accordance with various embodiments of the present technology, however, can be incorporated into and/or used by other systems, including hemodialysis systems and/or other medical or non-medical systems. Additionally, damping devices of the present technology can be used to reduce amplitudes of pressure pulsations in other solutions or fluids besides dialysate solution, such as water, saline, and/or other low viscous fluids. Furthermore, a person skilled in the art will understand (i) that the technology may have additional embodiments than illustrated in FIGS. 1-12B and (ii) that the technology may be practiced without several of the details of the embodiments described below with reference to FIGS. 1-12B.

A. OVERVIEW

Many systems include pumps (e.g., non-invasive pumps, peristaltic pumps, etc.) configured to regulate, control, and/or otherwise affect fluid flow through other components of the systems. For example, non-invasive pulsating pumps are commonly used to perform blood transfusions and cardiopulmonary bypass operations. Non-invasive pulsating pumps are also used in many industrial applications, such as in agriculture or in food dispensing. These pumps often produce pressure pulsations or fluctuations in fluid on which they operate. The pressure pulsations induced by pumps can make capturing accurate pressure measurements of the systems challenging, especially in systems that operate under small-pressure ranges. In addition, the pressure pulsations in fluid in medical systems may produce patient discomfort.

As a specific example, APD systems use pumps to transfer treatment fluid into and/or out of patients. APD systems typically operate in a pressure range of approximately −30 kPa to approximately +30 kPa. Under such small pressures, pressure pulsations induced by the pumps of the APD systems can have a significant impact on pressure readings of the APD systems. In turn, the ability of the APD systems to manage system pressures within acceptable and/or safe operating levels can be hindered. In addition, the pressure pulsations induced by the pumps can cause patient discomfort (e.g., when fluid comes in contact with patients).

To address these concerns, the inventors have developed damping devices that can be used in systems (e.g., in APD systems) to reduce pressure fluctuations in fluid caused by pumps. In one embodiment, for example, a damping device includes a body portion, a first membrane, and a second membrane. The body portion can include an inlet, an outlet, and one or more cavities (e.g., a first cavity and a second cavity) positioned between the inlet and the outlet. The one or more cavities can be fluidly coupled to the inlet and the outlet via one or more internal channels. The first membrane can be affixed to a first side of the body portion and can hermetically seal the one or more cavities through or about the first side of the body portion. Additionally, or alternatively, the second membrane can be affixed to a second side of the body portion opposite the first side and can hermetically seal the one or more cavities through or about the second side of the body portion. The first membrane, the second membrane, and the one or more cavities can define a fluid chamber of the damping device that is positioned between the inlet and the outlet of the body portion.

In operation, fluid enters the inlet and is directed into the first cavity. As fluid enters the first cavity, the first and second membranes can expand (e.g., under positive pressure flow) or contract (e.g., under negative pressure flow) to absorb a portion of pressure pulsation amplitudes in the fluid. Expansion and contraction of the membranes also increases and decreases, respectively, a total volume of a portion of the chamber that corresponds to the first cavity. The change in volume reduces or increases, respectively, fluid pressure in the first cavity. This process can be repeated as the solution enters the second cavity. As a result, amplitudes of pressure pulsations in fluid at the outlet can be less than amplitudes of pressure pulsations in fluid at the inlet. Such dampening of the amplitudes of pressure pulsations in fluid can facilitate capturing more accurate pressure readings in a system incorporating the damping device and can reduce (in a medical system) the likelihood of patient discomfort due to pressure pulsations in the fluid. In some embodiments, the damping device can further be operated in a vertical orientation to facilitate removal of air from fluid lines operably connected to a patient. This can reduce the likelihood that air is introduced into a patient and cause the patient discomfort or harm as a result.

Damping devices of the present technology therefore offer several advantages. For example, damping devices of the present technology include a small number of parts, which can minimize or reduce the cost of manufacturing and/or the complexity of assembling such devices. As discussed above, damping devices of the present technology can dampen pressure pulsation amplitudes, which is expected to facilitate capturing more accurate pressure readings and is further expected to decrease the probability of patient discomfort. Reducing pressure pulsation amplitudes is also expected to decrease the risk of disassembly or wear and tear of other components of systems incorporating or employing the damping devices of the present technology. In addition, reducing pressure pulsation amplitudes is expected to reduce physical vibrations and noise generated by the pumps of such systems during operation.

Damping devices of the present technology also offer several advantages in comparison with other damping devices. For example, other damping devices are most commonly employed in systems operating in high-pressure ranges. Thus, the other damping devices are often formed of metal or another material that can withstand the high pressures. Therefore, the other damping devices are heavy and expensive to manufacture. In contrast, damping devices configured in accordance with various embodiments of the present technology (e.g., damping devices configured for use in APD systems or in other systems operating in small-pressure ranges) can be formed of a biocompatible material (e.g., a plastic or a polymer) that is lightweight and/or relatively inexpensive. This can facilitate economically incorporating damping devices of the present technology in disposable sets of APD systems and/or other systems.

In addition, many damping devices include complicated designs with a large number of parts. For example, many damping devices include multiple inlets, multiple outlets, and multiple chambers. The chambers are typically stacked and separated from one another by a diaphragm. Fluid in one of the chambers helps dampen pulsations of fluid in another of the chambers through use of the diaphragm.

In contrast, damping devices configured in accordance with various embodiments of the present technology can include a single (e.g., only one) inlet, a single (e.g., only one) outlet, and a single (e.g., only one) fluid chamber between the inlet and the outlet. The chamber can be defined, at least in part, by one or more cavities (e.g., that operate in serial) and are in fluid communication with one another. The chamber can further be defined, at least in part, by one or more membranes affixed about a perimeter of the cavities and that are configured to expand and contract (e.g., against atmospheric pressure) to dampen pressure pulsations of fluid in the cavities. Thus, damping devices of the present technology can be readily incorporated into disposable sets of medical systems without complicated fluid line connections. Damping devices of the present technology comprise significantly fewer parts than other damping devices and have a simple design, each of which is expected to reduce costs of manufacturing and the complexity of assembling damping devices configured in accordance with the present technology.

B. SELECTED EMBODIMENTS OF DAMPING DEVICES, INCLUDING DAMPING DEVICES FOR APD MACHINES, AND ASSOCIATED SYSTEMS, DEVICES AND METHODS

FIG. 1 is a schematic representation of an APD system 100 ("the system 100") configured in accordance with various embodiments of the present technology. As shown, the system 100 includes a pump 101 and a disposable set 107. In some embodiments, the pump 101 can be a non-invasive pump. For example, the pump 101 can be a peristaltic pump or another suitable type of pump. The disposable set 107 of FIG. 1 includes a damping device 102, a cassette 104, a source bag 105, a drain bag 106, and various fluid lines extending between components of the disposable set 107 and/or the pump 101. Other well-known components of APD systems are not illustrated in FIG. 1 or described in detail below so as to avoid unnecessarily obscuring aspects of the present technology.

In some embodiments, the pump 101 can be integrated into (e.g., be a permanent part of) an APD machine or cycler (not shown). In these and other embodiments, various components of the disposable set 107 can interface with the APD machine. For example, the damping device 102 can be installed on (e.g., held in place, attached to, supported by, etc.) the APD machine such that the damping device 102 is positioned in a generally vertical orientation during an exchange treatment. The vertical orientation of the damping device 102 is discussed in greater detail below with respect to FIG. 3.

The disposable set 107 can be configured to interface (a) with the pump 101 and (b) with a catheter 109 installed in a patient 108. For example, the disposable set 107 can connect to the catheter 109 such that the catheter 109 is placed in fluid communication with the source bag 105 and/or the drain bag 106. In operation, the system 100 can be configured to introduce solution (e.g., initially contained within the source bag 105) into the patient 108 using the pump 101 and/or via at least a first portion of the disposable set 107. The system 100 can further be configured to remove solution from the patient 108 by draining the solution into the drain bag 106 using the pump 101 and/or via at least a second portion of the disposable set 107. In some embodiments, a single exchange treatment can include one or more cycles of introducing solution into the patient 108 and removing solution from the patient 108. After an exchange treatment is complete, the disposable set 107 can be discarded and a separate (e.g., a new) disposable set 107 can be used for a next exchange treatment.

As described in greater detail below with respect to FIGS. 2A-12B, the damping device 102 of the disposable set 107 can be configured to control, reduce, and/or minimize amplitudes of pressure pulsations in solution flowing through the damping device 102 and/or other components of the disposable set 107. For example, the damping device 102 can reduce amplitudes of positive and/or negative pressure pulsations that are induced in solution by the pump 101 such that solution flow through the disposable set 107 is smoothed. This can reduce, minimize, and/or eliminate patient discomfort while solution is pumped into and/or out of the patient 108. In these and other embodiments, the damping device 102 can be configured to remove air bubbles from solution within the damping device 102, which is expected to further reduce, minimize, and/or eliminate the possibility of patient discomfort or harm during an exchange treatment.

Figure 2A:
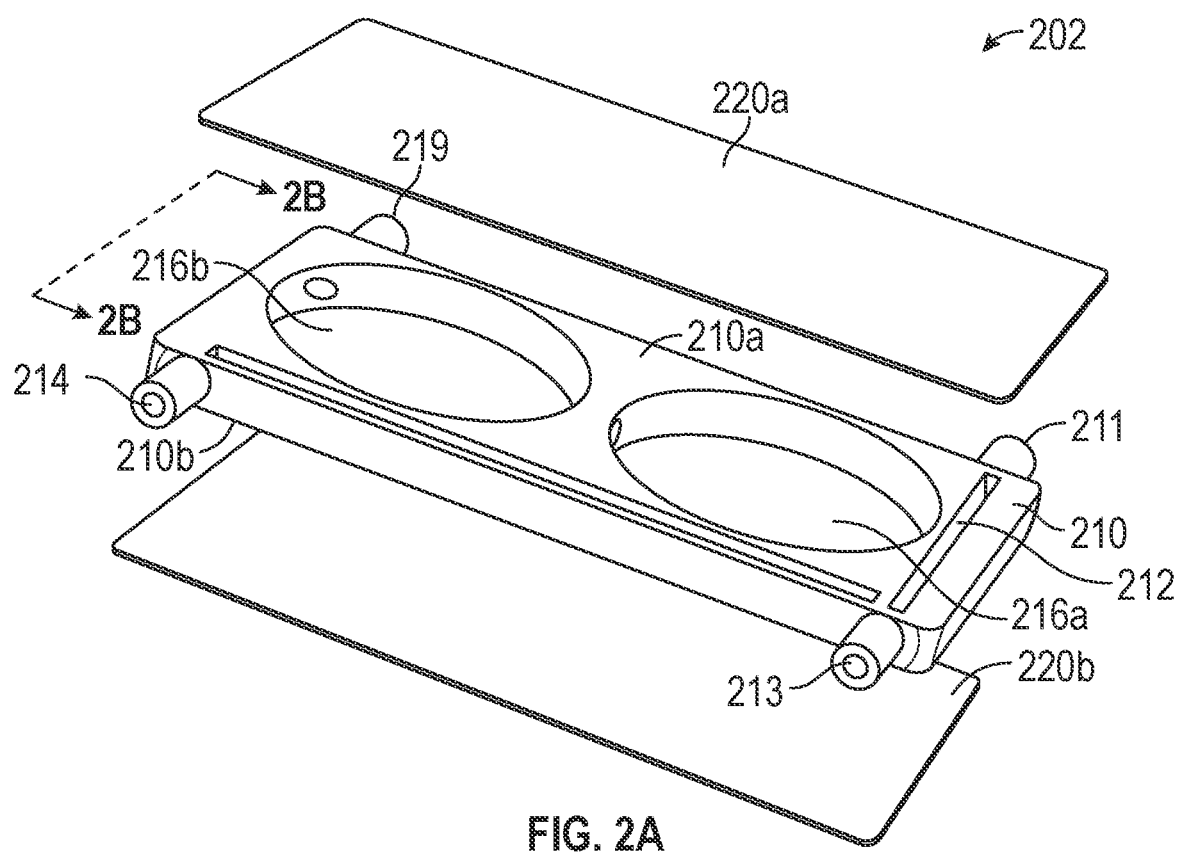
FIG. 2A is a partially schematic exploded view of a damping device configured in accordance with various embodiments of the present technology.

FIG. 2A is a partially schematic exploded view of a damping device 202 configured in accordance with various embodiments of the present technology. The damping device 202 can be the damping device 102 of FIG. 1 or another damping device of the present technology. As shown, the damping device 202 includes a body portion 210, a first membrane 220a, and a second membrane 220b.

In some embodiments, the body portion 210 can be formed of a first biocompatible material, such as a plastic, a polymer, or another suitable material. The first biocompatible material can be rigid or semi-rigid. In these and other embodiments, the first membrane 220a can be formed of a second biocompatible material, and the second membrane 220b can be formed of a third biocompatible material. The second and third biocompatible materials can be a plastic, a polymer, or another suitable material. Additionally, or alternatively, the second and/or third biocompatible materials can be flexible or semi-rigid, in these and other embodiments, the first biocompatible material, the second biocompatible material, and/or the third biocompatible material can be the same or different materials.

Figure 2B:
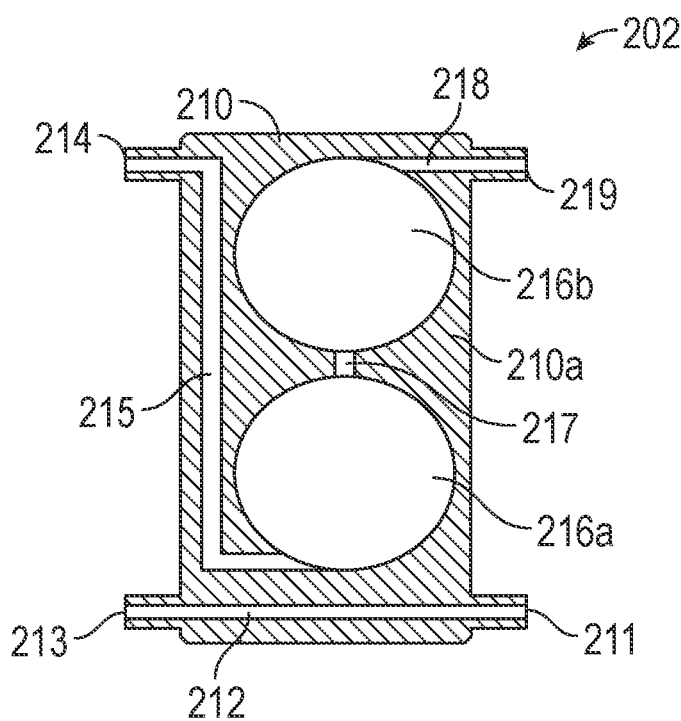
FIG. 2B is a partially schematic, cross-sectional front view of a body portion of the damping device of FIG. 2A.

FIG. 2B is a partially schematic, cross-sectional front view of the body portion 210 of the damping device 202 of FIG. 2A taken along line 2B-2B of FIG. 2A. Referring to FIGS. 2A and 2B together, the body portion 210 includes a channel 212 having a first end 211 and a second end 213, an inlet 214, and an outlet 219. The first end 211 of the channel 212 can be configured to operably connect to another component of a disposable set (e.g., an outlet of the cassette 104 of FIG. 1) directly or via a fluid line extending from the other component to the first end 211. The second end 213 of the channel 212 can be configured to operably connect to the inlet 214 of the damping device 202 and/or with another component of the disposable set. For example, a fluid line can extend from the second end 213 of the channel 212 to the inlet 214. Continuing with this example, the fluid line can interface with (e.g., pass through, come in contact with, etc.) a pump at a position along the fluid line between the second end 213 of the channel 212 and the inlet 214 of the damping device 202 (e.g., in such a way that the pump does not come into contact with solution within the fluid line). The channel 212 can therefore facilitate positioning and/or holding a fluid line in a desired position and/or orientation to interface with the pump and/or the inlet 214.

Although shown as including the channel 212 in FIGS. 2A and 2I, the damping device 202 can omit the channel 212 in other embodiments of the present technology. For example, a fluid line can extend from another component of the disposable set to the inlet 214 of the damping device 202 without first passing through a channel 212 of the damping device 202. Continuing with this example, the fluid line can additionally interface with a pump at a position along the fluid line between the other component of the disposable set and the inlet 214 of the damping device 202.

With continuing reference to FIGS. 2A and 2B, the outlet 219 of the damping device 202 can be operably connected to another component of a disposable set directly or via a fluid line extending from the outlet 219 to the other component of the disposable set. The other component of the disposable set can be a same or different component of the disposable set to which the first end 211 of the channel 212 can be operably connected. For example, as discussed in greater detail below with respect to FIG. 6B, the first end 211 of the channel 212 of the damping device 202 can be operably connected to an outlet of a cassette, and the outlet 219 of the damping device 202 can be operably connected to an inlet of the cassette. In other embodiments, the outlet 219 can be operably connected to a buffer of a disposable set as discussed in greater detail below with respect to FIG. 8.

The body portion 210 further includes one or more cavities 216 positioned between the inlet 214 and the outlet 219. In the illustrated embodiment, the body portion 210 includes a first cavity 216a and a second cavity 216b. In other embodiments, the body portion 210 can include a single cavity 216 or more than two cavities 216. The first cavity 216a of FIGS. 2A and 2B can be defined by a first hole or lumen that extends from a first side or surface 210a of the body portion to a second side or surface 210b of the body portion 210 opposite the first side 210a. Additionally, or alternatively, the second cavity 216b of FIGS. 2A and 28 can be defined by a second hole or lumen that extends from the first side 210a of the body portion 210 to the second side 210b. The cavities 216a and 216b can be in fluid communication (a) with the inlet 214 via a channel 215 and (b) with the outlet 219 via a channel 218. The first cavity 216a and the second cavity 216b can additionally be in fluid communication with one another via a channel 217 positioned between the first cavity 216a and the second cavity 216b.

The channels 212 and 215 are illustrated in FIG. 2A as being visible (e.g., without a cross-sectional view of the body portion 210) when viewing the first side 210a of the body portion 210, and the channels 217 and 218 (FIG. 2B) are illustrated as not being visible (e.g., without a cross-sectional view of the body portion 210) when viewing the first side 210a of the body portion 210. In these and other embodiments, the channels 212, 215, 217, and/or 218 can be visible (e.g., without a cross-sectional view of the body portion 210) when viewing the second side 210b of the body portion 210. In other embodiments, the channels 212, 215, 217, and/or 218 are not visible (e.g., without a cross-sectional view of the body portion 210) when viewing the first side 210a and/or the second side 210b of the body portion.

As described in greater detail below with respect to FIG. 3, the damping device 202 can be positioned and/or installed on a pump or APD machine in a vertical orientation. The vertical orientation of the damping device 202 can facilitate removing air bubbles from solution passing through the damping device 202. In particular, a solution can be introduced into the first cavity 216a of the damping device 202. During this process, air bubbles can rise to the top of the solution and exit from the outlet 219 of the damping device 202 via the channel 217, the second cavity 216b, and the channel 218.

Figure 2C:
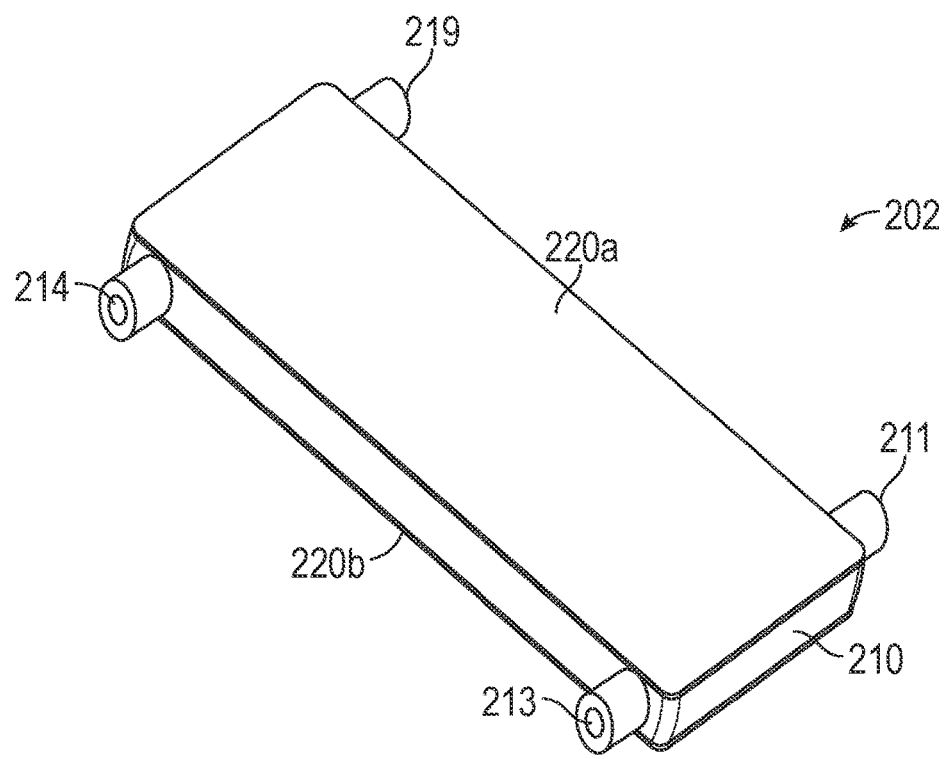
FIG. 2C is a partially schematic perspective view of the damping device of FIGS. 2A and 2B.

FIG. 2C is a partially schematic perspective view of the damping device 202 of FIGS. 2A and 2B. In particular, FIG. 2C illustrates the damping device 202 fully assembled. Referring to FIGS. 2A and 2C together, the first membrane 220a of the damping device 202 can be configured to interface with the first side 210a (FIG. 2A) of the body portion 210. In some embodiments, the first membrane 220a can be affixed (e.g., adhered, attached, etc.) to the first side 210a of the body portion 210 using an adhesive, such as a medical-grade and/or ultraviolet-cured adhesive. For example, the first membrane 220 can be adhered to the first side 210a of the body portion 210 (a) about a periphery of the cavities 216a and 216b (FIG. 2A) and/or (b) between the cavities 216a and 216b. Adherence of the first membrane 220a to the first side 210a of the body portion 210 can hermetically seal the cavities 216a and 216b and/or one or more of the channels 212, 215, 217, and/or 218 through or about the first side 210a of the body portion 210.

Additionally, or alternatively, the second membrane 220b of the damping device 202 can be configured to interface with the second side 210b (FIG. 2A) of the body portion 210. Similar to the first membrane 220a, the second membrane 220b can be affixed (e.g., adhered, attached, etc.) to the second side 210b of the body portion 210 (e.g., using an adhesive), such as (a) about a periphery of the cavities 216a and 216b and/or (b) between the cavities 216a and 216b. Adherence of the second membrane 220b to the second side 210b of the body portion 210 can hermetically seal the cavities 216a and 216b and/or one or more of the channels 212, 215, 217, and/or 218 through or about the second side 210b of the body portion 210.

When affixed to the body portion 210, the first membrane 220a, the second membrane 220b, the first cavity 216a, and/or the second cavity 216 can define (at least in part) a fluid chamber of the damping device 202. Thus, the damping device 202 can include a single (e.g., only one) chamber between the inlet 214 and the outlet 219 in some embodiments. This chamber can include two primary portions: (i) a first portion corresponding to the first cavity 216a, a first portion of the first membrane 220a covering the first cavity 216a at the first side 210a of the body portion 210, and a first portion of the second membrane 220b covering the first cavity 216a at the second side 210b of the body portion 210; and (ii) a second portion corresponding to the second cavity 216b, a second portion of the first membrane 220a covering the second cavity 216b at the first side 210a of the body portion 210, and a second portion of the second membrane 220b covering the second cavity 216b at the second side 210b of the body portion 210.

In some embodiments, one or both of the first and second membranes 220a and 220b can be transparent. The transparency of the first membrane 220a and/or the second membrane 220b can facilitate viewing or monitoring fluid flow through and/or the removal of air by the cavities 216a and 216b. In these and other embodiments, one or both of the first and second membranes 220a and 220b can be opaque. Operation of the first and second membranes 220a and 220b during fluid flow between the inlet 214 and the outlet 219 of the damping device 202 is described in greater detail below with respect to FIGS. 4A-4D.

Although shown with two membranes 220a and 220b in FIGS. 2A and 2C, damping devices configured in accordance with other embodiments of the present technology can include a greater (e.g., three or more) or lesser (e.g., one) number of membranes in other embodiments. For example, damping devices configured in accordance with other embodiments of the present technology can include only the first membrane 220a affixed to the first side 210a of the body portion 210 (e.g., when the first and/or second cavities 216a and/or 216b do not extend entirely through the body portion 210 from the first side 210a to the second side 210b), or only the second membrane 220b affixed to the second side 210b of the body portion 210 (e.g., when the first and/or second cavities 216a and/or 216b do not extend entirely through the body portion 210 from the second side 210b to the first side 210a). As another example, damping devices of the present technology can include a first membrane positioned over the first cavity 216a and affixed to the first side 210a of the body portion 210 and a second membrane positioned over the second cavity 216b and affixed to the first side 210a of the body portion 210. Additionally, or alternatively, the damping devices of the present technology can include a third membrane positioned over the first cavity 216a and affixed to the second side 210b of the body portion 210 and a fourth membrane positioned over the second cavity 216b and affixed to the second side 210b of the body portion 210.

In some embodiments, one or more features of the damping device 202 can be optimized for a specific application. For example, a thickness of the first membrane 220a, a thickness of the second membrane 220b, a material composition of the first membrane 220a, a material composition of the second membrane 220b, a diameter of the first cavity 216a, and/or a diameter of the second cavity 216b are examples of some of the features of the damping device 202 that can be optimized (e.g., using computational fluid dynamics (CPD) simulations on finite element method (FEM) or finite element analysis (FEA) software). A brief discussion of the optimization process for some embodiments is provided below.

Because a flow of solution in fluid lines of a disposable set in an APD system is pulsating, the flow of solution can be considered turbulent flow in some embodiments. The corresponding equation of continuity for turbulent flow is given by Equation 1 below, in which "$\rho$" is density and "u" is velocity of the fluid.

$$\frac{\partial p}{\partial t} + \nabla \cdot (\rho u) = 0 \quad \text{Equation 1}$$

Because the solution used in APD systems is often an incompressible fluid, density of the solution can remain constant over time. As such, the first term of Equation 1 can become zero, thereby providing Equation 2 below.

$$\nabla \cdot (\rho u) = 0 \quad \text{Equation 2:}$$

The Reynolds-averaged Navier-Stokes equation can be provided by Equation 3 below.

$$\rho \frac{\partial u}{\partial t} + \rho u \cdot \nabla u = -\nabla p + \nabla \left[ (\mu + u_T)(\nabla u + (\nabla u)^T) \right] + F \quad \text{Equation 3}$$

A usual and validated turbulence k-c model can used that is applicable for different flow fields.

A pressure inlet can be given in a model of the damping device 202, and the pulsating flow can be provided by Equation 4 below, in which (i) "A" and "B" are constants that determine total amplitude and mean pressure of the pulsating flow of solution, respectively, and (ii) revolutions per minute ("RPM") determines the speed of a pulsating pump motor.

$$0.5 \cdot \left( A \cdot \sin\left( 4 \cdot RPM \cdot 2 \frac{t}{60} \right) + A + B \right) \quad \text{Equation 4}$$

A two-way fluid-structure interaction (FSI) simulation can be run with a geometric nonlinearity option enabled in a solid mechanics interface because deflection of the membrane(s) will be nonlinear.

Different cavity sizes, membrane materials, and/or membrane thicknesses can then be simulated with the above parameters to evaluate a resulting output pressure graph that can be used to optimize these features of the damping device. In some embodiments, selection of a membrane material can be based at least in part on its appropriate flexural modulus for the damping flow up to, for example, 50 kPa.

Figure 3:
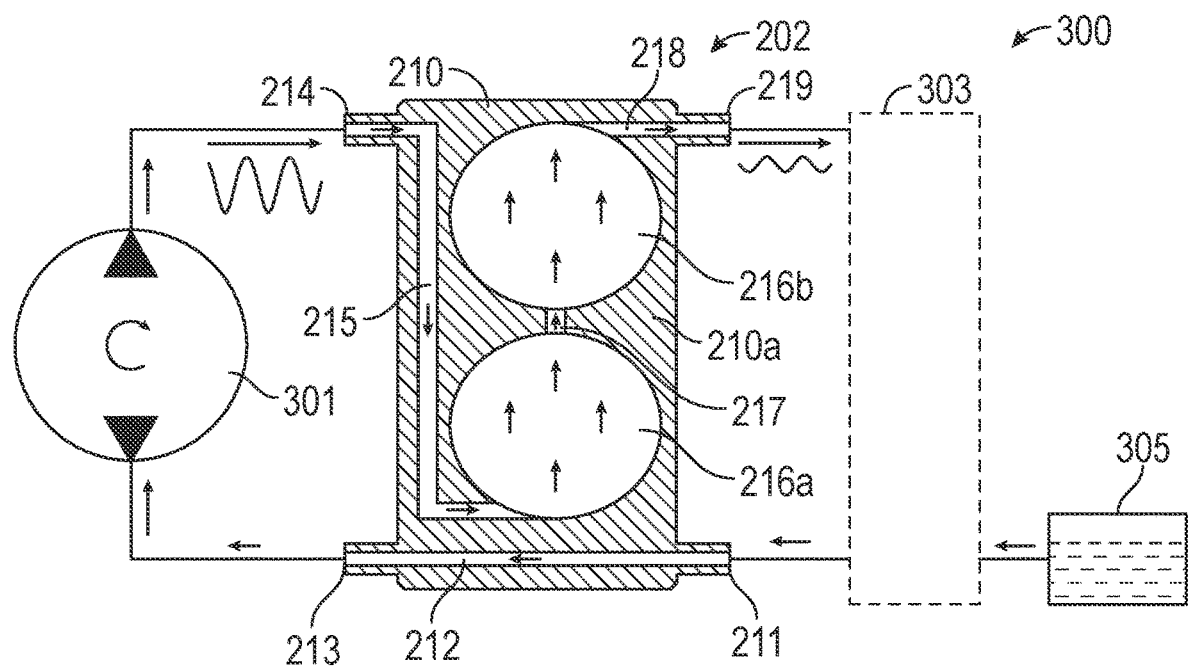
FIG. 3 is a partially schematic front view of solution flowing through an automated peritoneal dialysis system that includes the body portion of the damping device of FIGS. 2A-2C and is configured in accordance with various embodiments of the present technology.

FIG. 3 is a partially schematic front view of fluid flow through an APD system 300 including the body portion 210 of the damping device 202 of FIGS. 2A-2C and configured in accordance with various embodiments of the present technology. As shown, the first end 211 of the channel 212 is connected to a source bag 305 (e.g., the source bag 105 of FIG. 1 or another fluid reservoir) via one or more components 303 of a disposable set (e.g., the disposable set 107 of FIG. 1). A fluid line extends from the second end 213 of the channel 212 to the inlet 214 of the damping device 202. The fluid line further interfaces with a pump 301 (e.g., a non-invasive pump and/or the pump 101 of FIG. 1) at a position along the fluid line between the second end 213 of the channel 212 and the inlet 214.

As the pump 301 is operated in a clockwise direction, solution exits the source bag 305 and flows through the components 303 of the disposable set, through the channel 212 of the damping device 202, and through the pump 301. The solution then enters the damping device 202 via the inlet 214. Solution that enters the damping device 202 via the inlet 214 is then passed to a bottom portion of the first cavity 216a via the channel 215. As discussed above, the damping device 202 can be positioned in a vertical orientation during operation. In such an orientation, the solution fills the first cavity 216a from the bottom up and does not enter the second cavity 216b of the damping device 202 via the channel 217 until the first cavity 216a is filled. At this point, the solution fills the second cavity 216b from the bottom up and exits the damping device 202 via the channel 218 and the outlet 219 positioned at a top portion of the second cavity 216b.

The vertical orientation of the damping device 202 and the layout of the channels 215, 217, and 218 provide several advantages. For example, the presence of air in fluid lines of an APD system can affect pressure measurements and can cause harm or discomfort to a patient (e.g., when the air enters the patient's body). The vertical orientation of the damping device 202 and the layout of the channels 215, 217, and 219 is expected to reduce the probability of air bubbles becoming entrapped within the damping device 202 and/or within solution that enters the patient's body. In particular, an entire fluid network of a disposable set (including the channels 212, 215, 217, and 218 and the cavities 216a and 216b of the damping device 202) can be filled with solution before introducing solution into a patient. As part of this process, an air bubble that enters the damping device 202 via the inlet 214 can be directed to the bottom portion of the first cavity 216a via the narrow, downwardly-extending channel 215. At this point, the air bubble can immediately begin rising towards the top of the second cavity 216b (because air is lighter than the solution) and can exit the outlet 219 of the damping device 202. As solution fills the first and second cavities 216a and 216b, the solution can likewise force air present in the damping device 202 to exit the damping device 202 via the channel 218 and the outlet 219 positioned at the top portion of the second cavity 216b. Thus, the damping device 202 helps clear the disposable set of air bubbles such that the probability of air bubbles being introduced into the patient is reduced. The filling process of the vertically-oriented damping device 202 can also increase the likelihood that any solution present in the cavities 216a and 216b is removed via the outlet 219. Stated another way, the filling process of the vertically-oriented damping device 202 can decrease the likelihood that solution becomes entrapped and remains within the damping device 202.

As discussed above, the damping device 202 includes a first membrane 220a (FIGS. 2A and 2C) and a second membrane 220b (FIGS. 2A and 2C) affixed to the first side 210a and the second side 210b, respectively, of the body portion 210. The first and second membranes 220a and 220b can hermetically seal the first cavity 216a, the second cavity 216b, and/or one or more of the channels 212, 215, 217, and/or 218 of the body portion 210. In addition, the first and second membranes 220a and 220b can be flexible or semi-rigid, with an outside surface (e.g., a surface opposite the body portion 210) exposed to atmospheric or another pressure.

In operation, the first membrane 220a and/or the second membrane 220b can be configured to dampen pressure pulsations in solution that passes through the damping device 202. For example, at the inlet 214, solution can have first pressure pulsations (e.g., caused by the pump 301), which are represented by a waveform illustrated at the inlet 214 of the damping device 202 in FIG. 3. At the outlet 219 of the damping device 202, solution can have a second pressure pulsations, which are represented by a waveform illustrated at the outlet 219 in FIG. 3. Amplitudes of the second pressure pulsations in solution at the outlet 219 of the damping device 202 can be less than amplitudes of the first pressure pulsations in solution at the inlet 214. In other words, the damping device 202 can dampen amplitudes of pressure pulsations in solution that passes through the cavities 216a and 216b of the damping device 202.

Figure 4D:
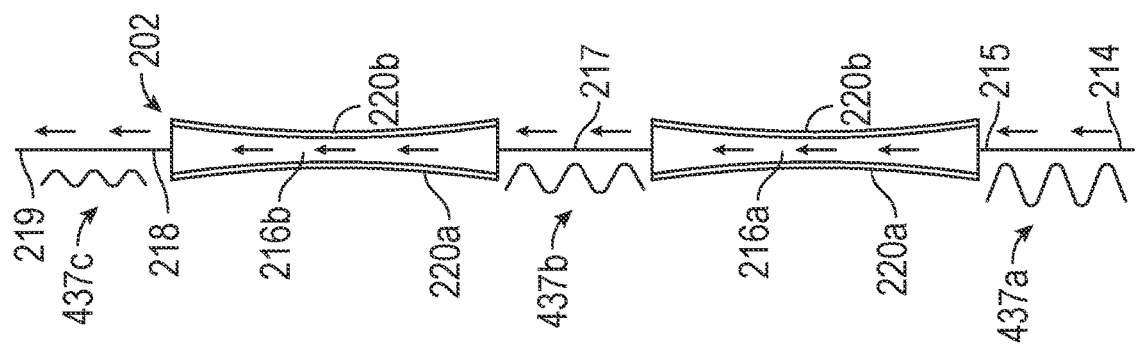
FIGS. 4A-4D are partially schematic side views of the damping device of FIGS. 2A-3 illustrating a damping process as solution flows through the damping device, in accordance with various embodiments of the present technology.
Figure 4C:
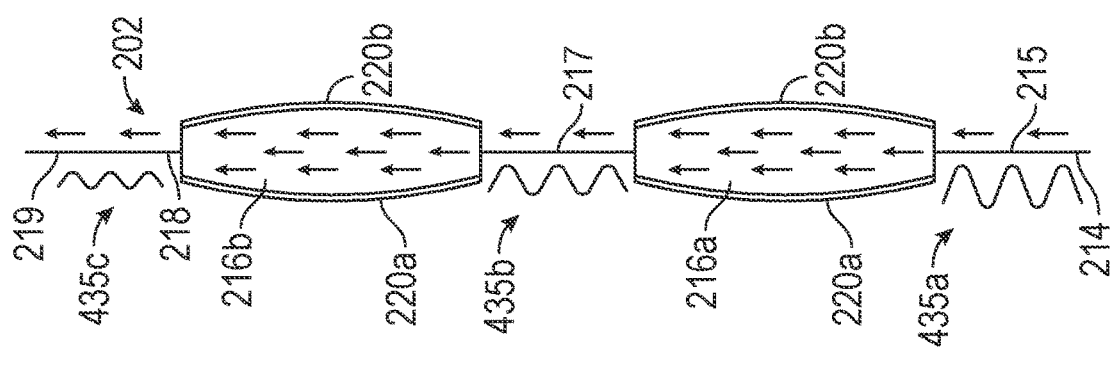
Figure 4B:
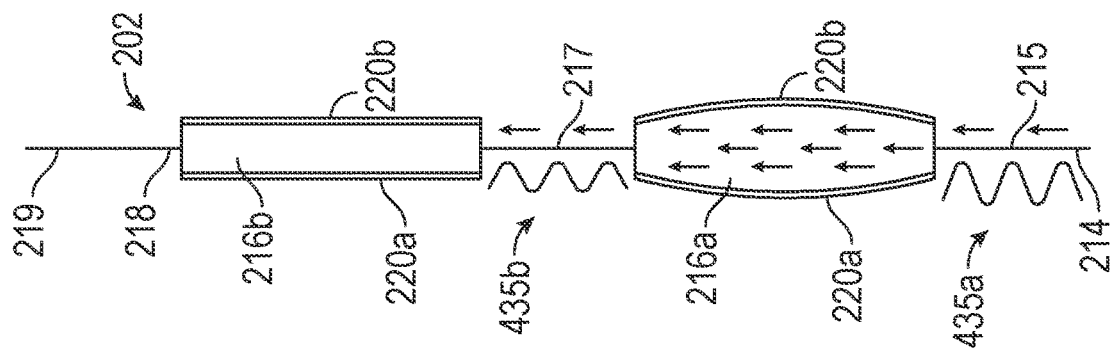
Figure 4A:
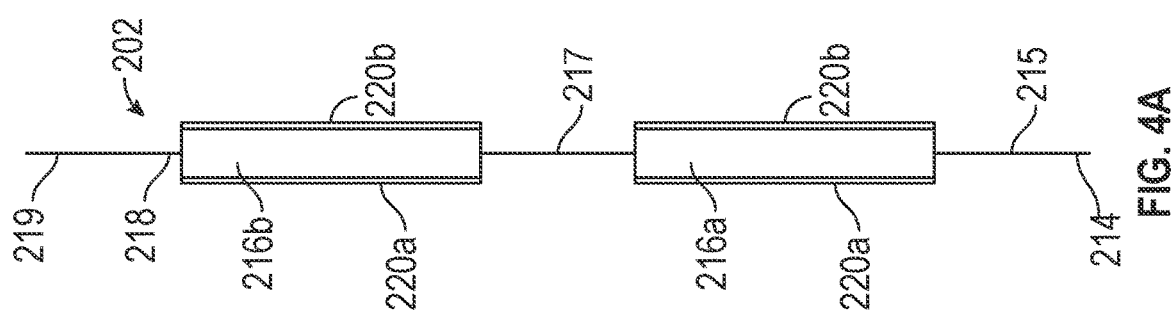

FIGS. 4A-4D are partially schematic side views of the damping device 202 of FIGS. 2A-3 illustrating a damping process as solution flows through the damping device 202. Referring first to FIG. 4A, solution has not yet entered the first cavity 216a or the second cavity 216b of the damping device 202. As such, the first membrane 220a and the second membrane 220b are illustrated as relaxed and/or undeformed over each of the cavities 216a and 216b.

In FIG. 4B, solution (represented by small arrows in FIG. 4B) enters the damping device 202 via the inlet 214 under positive pressure and fills the first cavity 216a. Solution at the inlet 214 has first pressure pulsations (e.g., caused by a pump operably connected to the inlet 214), which are represented by a first waveform 435a illustrated at the inlet 214 and the channel 215 in FIG. 4B. When the solution enters the first cavity 216a, first portions of the first membrane 220a and the second membrane 220b that cover the first cavity 216a can absorb a percentage of amplitudes of pressure pulses in the solution by expanding or deflecting/deforming (i) outwards during positive pressure flow (e.g., induced by the pump) and (ii) against atmospheric or another pressure applied to the outside surfaces of the first and second membranes 220a and 220b. As the first portions of the first and second membranes 220a and 220b are deflected outwards, a total volume of a portion of the chamber of the damping device 202 corresponding to the first cavity 216a increases, thereby reducing solution flow pressure in the first cavity 216a. Thus, solution that exits the first cavity 216a via the channel 217 has second pressure pulsations, which are represented by a second waveform 435b illustrated at the channel 217 in FIG. 4B. Notably, amplitudes of the second pressure pulsations (in waveform 435b) are less than amplitudes of first pressure pulsations (in waveform 435a), meaning that the damping device 202 dampens the amplitudes of positive pressure pulsations in solution flowing through the first cavity 216a.

In FIG. 4C, the above process is repeated in the second cavity 216b. In particular, once the first cavity 216a is filled, the solution enters the second cavity 216b via the channel 217 and fills the second cavity 216b. When the solution enters the second cavity 216b, second portions of the first membrane 220a and the second membrane 220b that cover the second cavity 216b can absorb a percentage of amplitudes of pressure pulses in the solution by expanding or deflecting/deforming (i) outwards during positive pressure flow and (ii) against atmospheric or another pressure applied to the outside surfaces of the first and second membranes 220a and 220b. As the second portions of the first and second membranes 220a and 220b are deflected outwards, a total volume of a portion of the chamber of the damping device 202 corresponding to the second cavity 216b increases, thereby reducing solution flow pressure in the second cavity 216b. Thus, solution that exits the second cavity 216b via the channel 218 and the outlet 219 has third pressure pulsations, which are represented by a third waveform 435c illustrated at the channel 218 and the outlet 219 in FIG. 4C. Notably, amplitudes of the third pressure pulsations (in waveform 435c) are less than the amplitudes of the second pressure pulsations (in waveform 435b), meaning that the damping device 202 can dampen the amplitudes of positive pressure pulsations in solution flowing through the second cavity 216b even further than the amplitudes of pressure pulsations in the solution are dampened when the solution flows through only the first cavity 216a.

FIG. 4D illustrates the damping process when solution enters the damping device 202 via the inlet 214 under negative pressure. As shown, solution at the inlet 214 can have fourth pressure pulsations (e.g., caused by the pump), which are represented by a fourth waveform 437a illustrated at the inlet 214 and the channel 215 in FIG. 4D. When the solution enters the first cavity 216a, the first portions of the first membrane 220a and the second membrane 220b can absorb a percentage of amplitudes of pressure pulses in the solution by contracting or deflecting/deforming (i) inwards during negative pressure flow (e.g., induced by the pump) and (ii) away from atmospheric or another pressure applied to the outside surfaces of the first and second membranes 220a and 220b. As the first portions of the first and second membranes 220a and 220b are deflected inwards, the total volume of the portion of the chamber of the damping device 202 corresponding to the first cavity 216a decreases, thereby increasing solution flow pressure in the first cavity 216a. Thus, solution that exits the first cavity 216a via the channel 217 can have fifth pressure pulsations (represented by a fifth waveform 437b illustrated at the channel 217 in FIG. 4D) that have amplitudes less than amplitudes of the fourth pressure pulsations (in waveform 437a).

Once the first cavity 216a is filled, the solution can enter the second cavity 216b via the channel 217 and can fill the second cavity 216b. When the solution enters the second cavity 216b, the second portions of the first membrane 220a and the second membrane 220b that cover the second cavity 216b can absorb a percentage of amplitudes of pressure pulses in the solution by contracting or deflecting/deforming (i) inwards during negative pressure flow and (ii) away from atmospheric or another pressure applied to the outside surfaces of the first and second membranes 220a and 220b. As the second portions of the first and second membranes 220a and 220b are deflected inwards, the total volume of the portion of the chamber of the damping device 202 corresponding to the second cavity 216b decreases, thereby increasing solution flow pressure in the second cavity 216b. Thus, solution that exits the second cavity 216b via the channel 218 and the outlet 219 can have sixth pressure pulsations (represented by a sixth waveform 437c illustrated at the channel 218 and the outlet 219 in FIG. 4D) that have amplitudes less than the amplitudes of the fourth pressure pulsations (in waveform 437a) and the fifth pressure pulsations (in waveform 437b).

In other words, the first membrane 220a and the second membrane 220b of the damping device 202 can expand and/or contract such that the amplitudes of positive and/or negative pressure pulsations, respectively, in solution flowing through the damping device 202 are reduced or dampened. This can smooth solution flow through other components of a disposable set, which in turn can smooth solution flow into and/or out of a patient. As a result, the damping device 202 is expected to reduce, minimize, and/or eliminate patient discomfort due to pressure pulsations in solution during an exchange treatment.

Figure 5A:
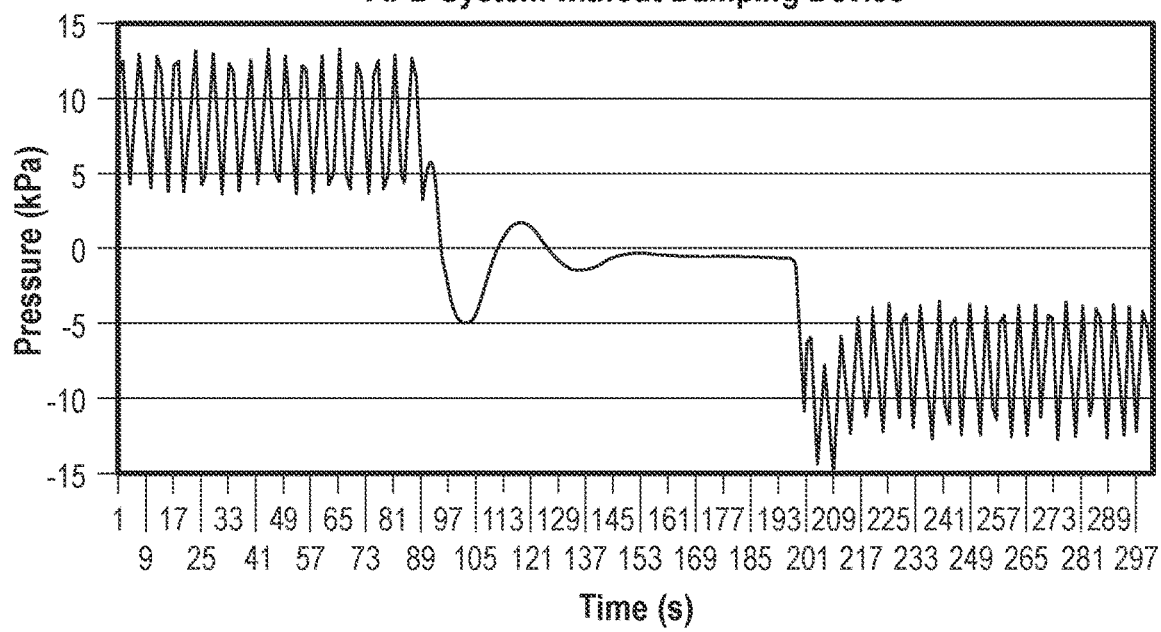
FIG. 5A is a line plot illustrating pressure observed over time in an automated peritoneal dialysis system lacking a damping device configured in accordance with various embodiments of the present technology.
Figure 5B:
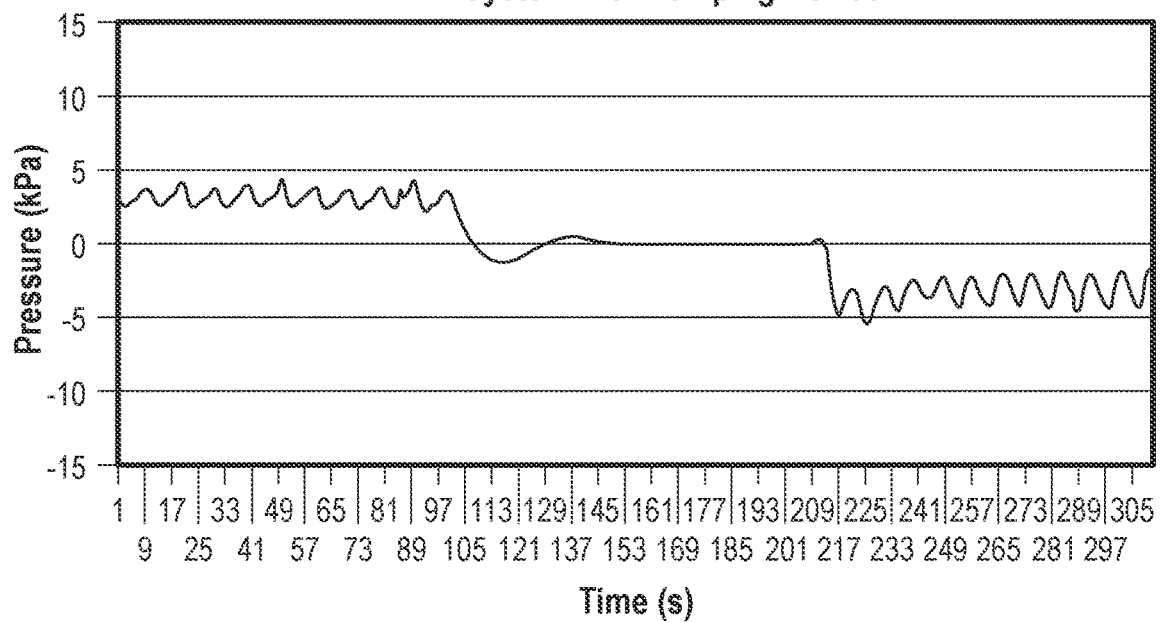
FIG. 5B is a line plot illustrating pressure observed over time in an automated peritoneal dialysis system including a damping device configured in accordance with various embodiments of the present technology.

FIGS. 5A and 5B are line plots 531 and 532, respectively, illustrating pressure induced by a pump of an APD system over time. In particular, the line plot 531 of FIG. 5A illustrates pressure induced over time by a pump in an APD system lacking a damping device of the present technology, whereas the line plot 532 of FIG. 5B illustrates pressure induced over time by the pump in an APD system that includes a damping device of the present technology. Each of the line plots 531 and 532 are generated by (a) operating the pump in a clockwise direction for a period of time to generate positive pressure and (b) operating the pump in a counter-clockwise direction for a period of time to generate negative pressure.

As shown in the line plot 531 of FIG. 5A, operating the pump in a clockwise direction generates positive pressure oscillations between approximately 4.5 kPa and 12.5 kPa. Thus, operating the pump in a clockwise direction in an APD system without a damping device of the present technology can result in positive pressure pulsations having amplitudes of approximately 8 kPa. Similarly, operating the pump in a counter-clockwise direction generates negative pressure oscillations between approximately −4 kPa and −13 kPa. Thus, operating the pump in a counter-clockwise direction can result in negative pressure pulsations having amplitudes of approximately 9 kPa. Such large pressure pulsation amplitudes can affect pressure measurements taken by various sensors of the APD system and can result is solution flow that can cause patient discomfort during an exchange treatment.

Referring now to the line plot 532 of FIG. 5B, operating the pump in a clockwise direction and in conjunction with a damping device of the present technology can generate positive pressure oscillations between approximately 3 kPa and 4.5 kPa. Thus, operating the pump in a clockwise direction in an APD system that includes a damping device of the present technology can result in positive pressure pulsations having amplitudes of approximately 1.5 kPa. Similarly, operating the pump in a counter-clockwise direction and in conjunction with a damping device of the present technology can generate negative pressure oscillations between approximately −2.5 kPa and −4.5 kPa. Thus, operating the pump in a counter-clockwise direction can result in negative pressure pulsations having amplitudes of approximately 2 kPa. As such, use of a damping device of the present technology in this simulation (i) reduced or dampened amplitudes of positive pressure pulsations by approximately 6.5 kPa and (ii) reduced or dampened amplitudes of negative pressure pulsations by approximately 7 kPa.

The lower amplitudes of positive and negative pressure pulsations realized by the APD system of FIG. 5B (in which a damping device of the present technology was used) do not affect pressure measurements taken by various sensors of the APD system to as large of an extent as do the higher amplitudes realized by the APD system of FIG. 5A (in which a damping device of the present technology was not used). As such, damping devices of the present technology are expected to improve pressure measurements of APD systems. Additionally, or alternatively, the lower amplitudes represent smoother solution flow throughout an APD system. As a result, damping devices of the present technology are expected to reduce the likelihood of patient discomfort during an exchange treatment stemming from pressure pulsations in solution flowing through APD systems. Furthermore, the lower amplitudes cause fewer and/or less severe physical vibrations and generate less noise than the higher amplitudes realized in APD systems lacking a damping device of the present technology. Thus, damping devices of the present technology are expected to reduce physical vibrations and noise generated by pumps of APD systems, thereby reducing the effects of the pump on sensitive components of the APD systems and reducing the likelihood that components of the APD systems become unmounted during use.

Furthermore, use of the damping device in the APD system of FIG. 5B additionally (a) reduced an average pressure induced by the pump for positive pressure oscillations from approximately 8.5 kPa to approximately 3.75 kPa and (b) reduced an average pressure induced by the pump for negative pressure oscillations from approximately 8.5 kPa to approximately 3.5 kPa. The lower average pressures induced by the pump and the lower amplitudes of pressure pulsations are expected to reduce the speed of wear and tear on components of APD systems and/or to reduce the likelihood that assembled components of the APD systems (e.g., components including parts bonded together with adhesives, welds, heat seals, etc.) become disassembled during use.

Figure 6A:
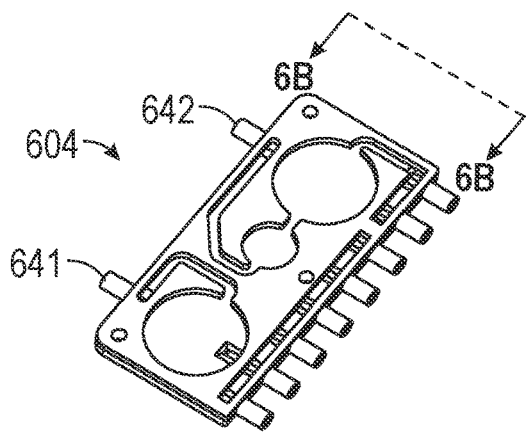
FIG. 6A is a partially schematic perspective view of a cassette configured in accordance with various embodiments of the present technology.

FIG. 6A is a partially schematic perspective view of a cassette 604 configured in accordance with various embodiments of the present technology. The cassette 604 can be the cassette 104 of the APD system 100 of FIG. 1 or another suitable cassette. As shown, the cassette 604 has an outlet 641 and an inlet 642. In operation, the cassette 604 can be configured to facilitate fluid connections between various fluid lines of an APD system and/or to distribute fluid to appropriate components of the APD system during various stages (e.g., introduction of solution into a patient, removal of solution from a patient, etc.) of an exchange treatment.

Figure 6B:
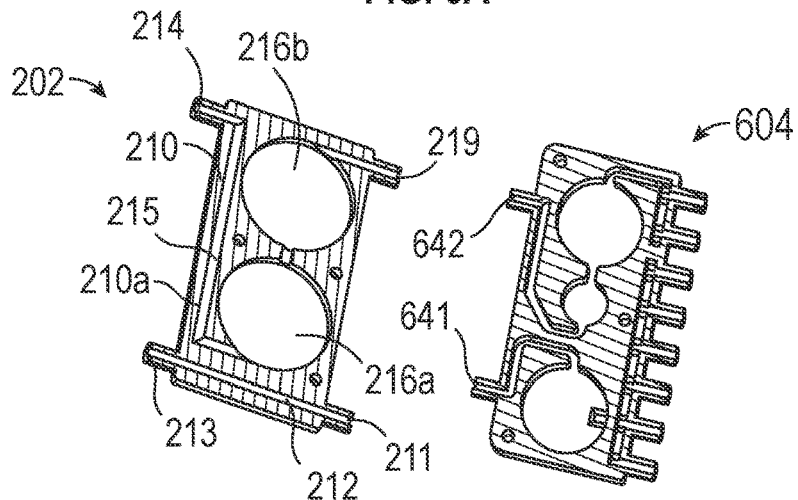
FIG. 6B is a partially schematic cross-sectional view of the cassette of FIG. 6A and of the damping device of FIGS. 2A-3 configured in accordance with various embodiments of the present technology.

Referring now to FIG. 6B (which is a partially schematic cross-sectional view of the cassette 604 of FIG. 6A taken along line 6B-6B of FIG. 6A and of the body portion 210 of the damping device 202 of FIGS. 2A-3), the outlet 641 of the cassette 604 can be configured to operably connect to the first end 211 of the channel 212 of the damping device 202 of FIGS. 2A-3, and the inlet 642 of the cassette 604 can be configured to operably connect to the outlet 219 of the damping device 202. For example, a fluid line can be used to operably connect the outlet 641 of the cassette 604 to the first end 211 of the channel 212. Respective ends of the fluid line can be glued or otherwise attached to the outlet 641 and to the first end 211. Additionally, or alternatively, another fluid line can be used to operably connect the inlet 642 of the cassette 604 to the outlet 219 of the damping device 202. Respective ends of the other fluid line can be glued or otherwise attached to the inlet 642 and to the outlet 219.

Figure 7:
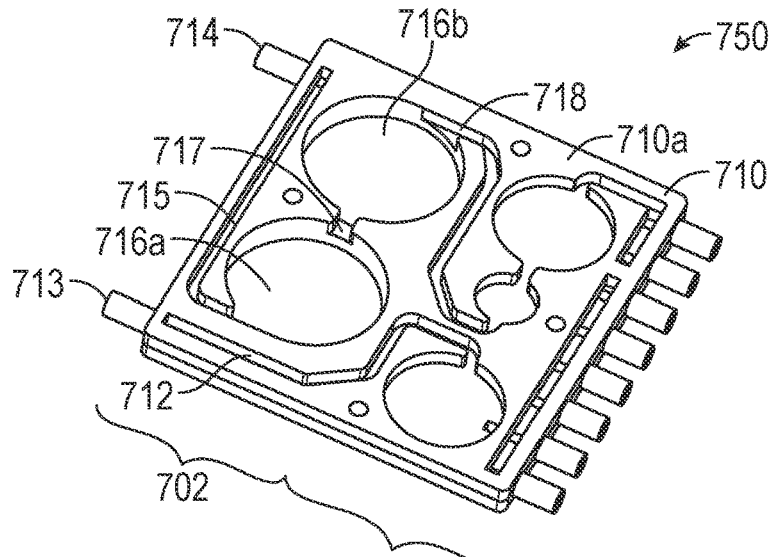
FIG. 7 is a partially schematic perspective view of a body portion of a damping cassette configured in accordance with various embodiments of the present technology.

FIG. 7 is a partially schematic perspective view of a body portion 710 of a damping cassette 750 configured in accordance with various embodiments of the present technology.

The damping cassette 750 can include a damping portion 702 and a cassette portion 704. The damping portion 702 of the damping cassette 750 is integrated with the cassette portion 704 in the embodiment illustrated in FIG. 7. The damping portion 702 can be similar to the damping device 202 of FIGS. 2A-3 and 6B. For example, the damping portion 702 of the damping cassette 750 can include a channel 712 having an end 713, an inlet 714, a channel 715, a first cavity 716a, a second cavity 716b, a channel 717, and a channel 718 that are similar or identical to the channel 212 having a second end 213, the inlet 214, the channel 215, the first cavity 216a, the second cavity 216b, the channel 217, and the channel 218, respectively, of FIGS. 2A-3 and 6B. Additionally, or alternatively, the cassette portion 704 can be similar to the cassette 604 of FIGS. 6A and 6B. Therefore, the damping portion 702 and the cassette portion 704 of the damping cassette 750 of FIG. 7 can operate similar to the separate damping device 202 and cassette 604, respectively, of FIG. 6B.

Unlike the damping device 202 and the cassette 604 of FIG. 6B, the damping cassette 750 of FIG. 7 does not include (a) the first end 211 of the channel 212 of the damping device 202, (b) the outlet 219 of the damping device 202, (c) the outlet 641 of the cassette 604, or (d) the inlet 642 of the cassette 604. Instead, the channel 712 of the damping portion 702 of the damping cassette 750 (which can correspond to the channel 212 of the damping device 202) extends into the cassette portion 704 of the damping cassette. Thus, the end 713 of the channel 712 (which can correspond to the second end 213 of the channel 212 of the damping device 202) can effectively be an outlet of the cassette portion 704 of the damping cassette 750. Similarly, the channel 718 of the damping portion 702 (which can correspond to the channel 218 of the damping device 202) extends into the cassette portion 704 of the damping cassette 750, effectively functioning as an inlet of the cassette portion 704.

A first membrane (not shown) similar to the first membrane 220a of FIGS. 2A and 2C can be affixed to a first side or surface 710a of the body portion 710 of the damping cassette 750 of FIG. 7. In some embodiments, the first membrane (when affixed to the body portion 710) extends across the entire first side 710a of the body portion 710, including the cassette portion 704. In other embodiments, the first membrane (when affixed to the body portion 710) can extend across only a portion of the first side 710a of the body portion 710. For example, the first membrane can extend across only the damping portion 702 of the first side 710a of the body portion 710.

A second membrane (not shown) similar to the second membrane 220b of FIGS. 2A and 2C can be affixed to a second side or surface of the body portion 710 of the damping cassette 750 opposite the first side 710a. In some embodiments, the second membrane (when affixed to the body portion 710) extends across the entire second side of the body portion 710, including the cassette portion 704. In other embodiments, the second membrane (when affixed to the body portion 710) can extend across only a portion of the second side of the body portion 710. For example, the second membrane can extend across only the damping portion 702 of the second side of the body portion 710.

The damping cassette 750 can offer several advantages. For example, two separate molds may be required to manufacture the separate damping device 202 and cassette 604 of FIG. 6B. In contrast, a single mold can be used to manufacture the damping cassette 750 of FIG. 7, which is expected to reduce manufacturing costs. Furthermore, because the damping portion 702 of the damping cassette 750 is integrated with the cassette portion 704, the damping cassette 750 does not require fluid lines to connect the damping portion 702 to the cassette portion 704. Thus, the damping cassette 750 can reduce the total number of parts included in a disposable set of an APD system, which is expected to reduce the cost of each disposable set and/or the cost of operating the APD system.

Additionally, or alternatively, in the embodiment illustrated in FIG. 6B, there can be up to four connection points where fluid lines are connected to (a) the first end 211 of the channel 212 of the damping device 202, (b) the outlet 219 of the damping device 202, (c) the outlet 641 of the cassette 604, and (d) the inlet 642 of the cassette 604. In contrast, the damping cassette 750 of FIG. 7 does not include these connection points. Thus, the damping cassette 750 can offer a more stable system and can reduce the likelihood of system complications occurring between the damping portion 702 and the cassette portion 704 (e.g., due to failed connection points).

Figure 8:
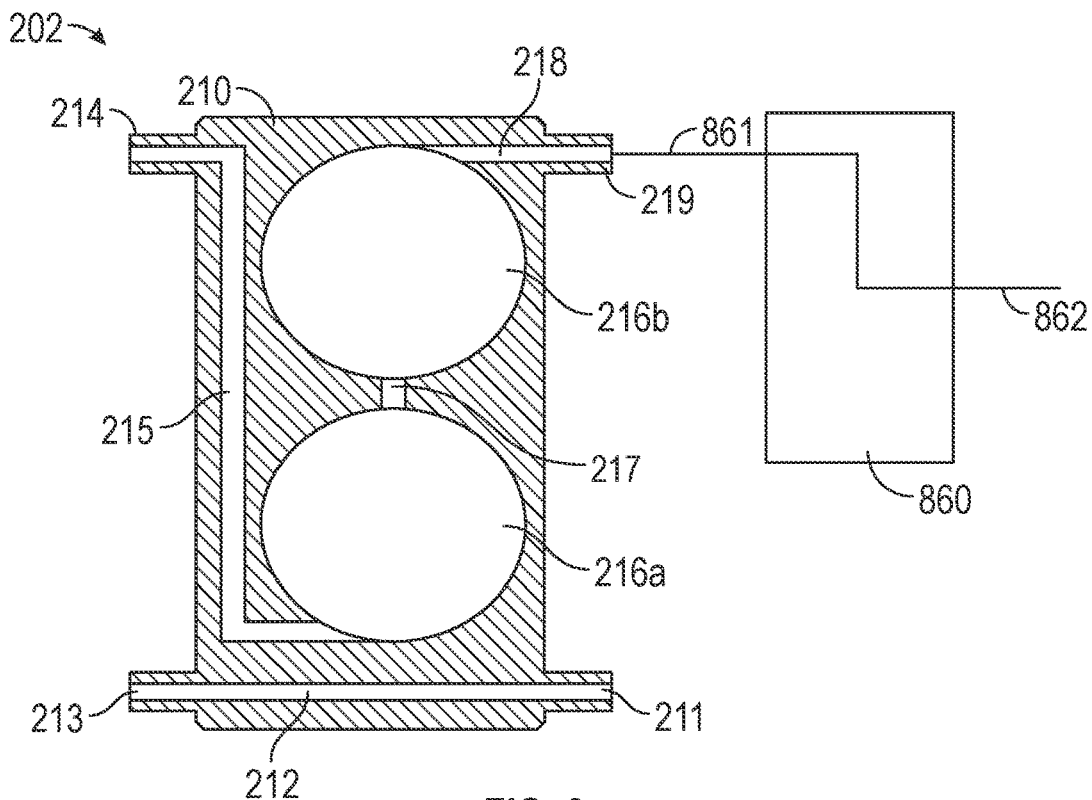
FIG. 8 is a partially schematic front view of a buffer and of the body portion of the damping device of FIGS. 2A-3, each configured in accordance with various embodiments of the present technology.

Damping devices of the present technology can be integrated into other components of an APD system, such as other components of a disposable set of the APD system. For example, FIG. 8 is a partially schematic front view of the body portion 210 of the damping device 202 of FIGS. 2A-3 provided alongside a separate fluid buffer 860 configured in accordance with various embodiments of the present technology. As shown, the buffer 860 includes an inlet 861 and an outlet 862. The inlet 861 of the buffer 860 can be operably connected to the outlet 219 of the damping device 202. A fluid line can be used to facilitate the connection.

Figure 9:
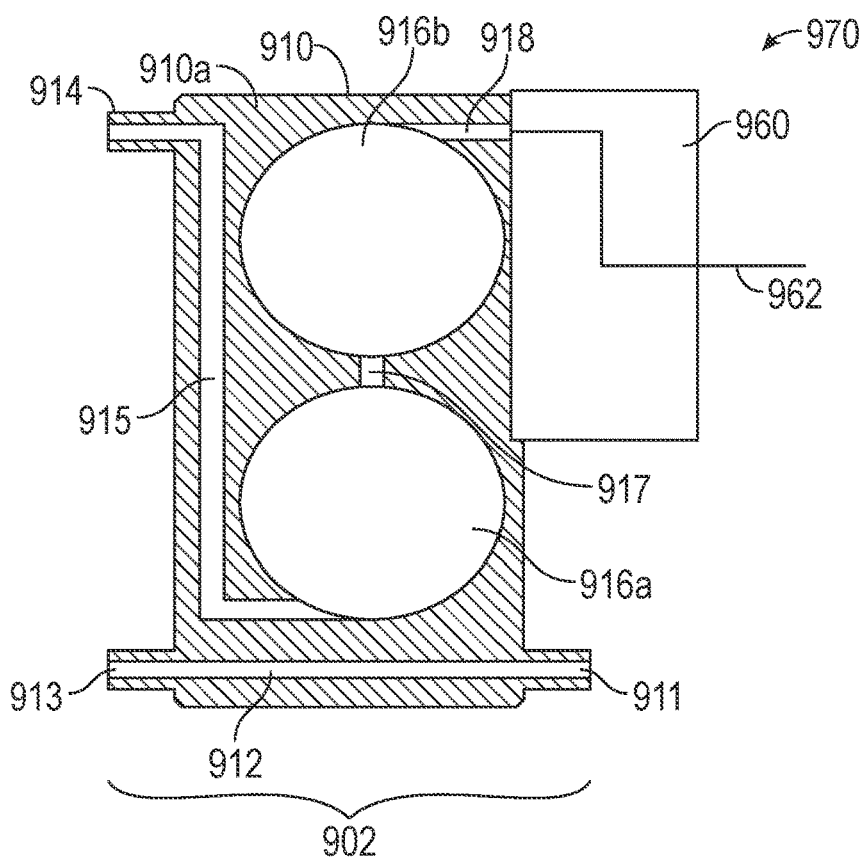
FIG. 9 is a partially schematic front view of a body portion of a damping buffer configured in accordance with various embodiments of the present technology.

FIG. 9 is a partially schematic front view of a body portion 910 of a damping buffer 970 configured in accordance with various embodiments of the present technology. The damping buffer 970 can include a damping portion 902 and a buffer portion 960. The damping portion 902 can be integrated with the buffer portion 960. The damping portion 902 can be similar to the damping device 202 of FIGS. 2A-3 and 8. For example, the damping portion 902 of the damping buffer 970 can include a channel 912 having a first end 911 and a second end 913, an inlet 914, a channel 915, a first cavity 916a, a second cavity 916b, a channel 917, and a channel 918 that are similar or identical to the channel 212 having a first end 211 and a second end 213, the inlet 214, the channel 215, the first cavity 216a, the second cavity 216b, the channel 217, and the channel 218, respectively, of FIGS. 2A-3 and 8. Additionally, or alternatively, the buffer portion 960 of the damping buffer 970 can be similar to the buffer 860 of FIG. 8. For example, the buffer portion 960 of the damping buffer 970 can include an outlet 962 that is similar to the outlet 862 of the buffer 860 of FIG. 8. Therefore, the damping portion 902 and the buffer portion 960 of the damping buffer 970 of FIG. 9 can operate similar to the separate damping device 202 and buffer 860, respectively, of FIG. 8.

Unlike the damping device 202 and the buffer 860 of FIG. 8, the damping buffer 970 of FIG. 9 does not include (a) the outlet 219 of the damping device 202 and (b) the inlet 861 of the buffer 860. Instead, the channel 918 of the damping portion 902 of the damping buffer 970 (which can correspond to the channel 218 of the damping device 202) extends into the buffer portion 960, effectively functioning as an inlet of the buffer portion 960. Thus, the damping buffer 970 can offer several advantages (e.g., reduced manufacturing costs, fewer system parts, fewer connection points, etc.) offered by the damping cassette 750 of FIG. 7.

A first membrane (not shown) similar to the first membrane 220a of FIGS. 2A and 2C can be affixed to a first side or surface 910a of the body portion 910 of the damping buffer 970. In some embodiments, the first membrane (when affixed to the body portion 910) can (a) extend across the entire first side 910a of the body portion 910 (including the buffer portion 960) or (b) extend across only a portion of the first side 910a of the body portion 910 (e.g., across only the damping portion 902).

A second membrane (not shown) similar to the second membrane 220b of FIGS. 2A and 2C can be affixed to a second side or surface of the body portion 910 opposite the first side 910a. In some embodiments, the second membrane (when affixed to the body portion 910) can (a) extend across the entire second side of the body portion 910 (including the buffer portion 960) or (b) extend across only a portion of the second side of the body portion 910 (e.g., across only the damping portion 902).

Figure 10:
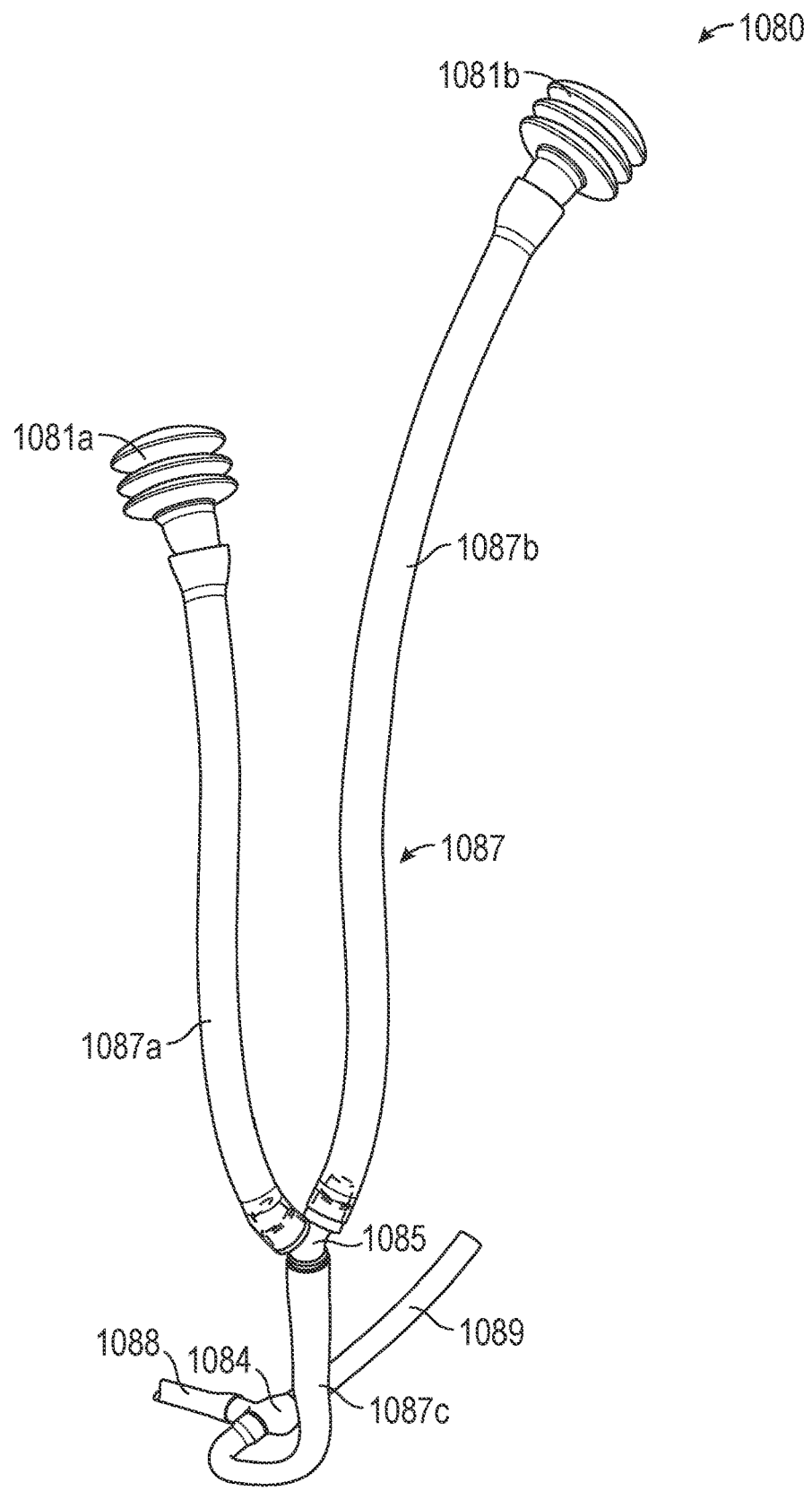
FIG. 10 is a partially schematic representation of another damping device configured in accordance with various embodiments of the present technology.

FIG. 10 is a partially schematic representation of another damping device 1080 configured in accordance with various embodiments of the present technology. The damping device 1080 includes one or more bellows 1081. In the illustrated embodiment, the damping device 1080 includes a first bellows 1081a and a second bellows 1081b. The first and second bellows 1081a and 1081b can be formed of a biocompatible material, such as a plastic, a polymer, or another suitable material. The biocompatible material can be flexible or semi-rigid.

The damping device 1080 further includes a tubing structure 1087 operably connecting the first and second bellows 1081a and 1081b to other fluid lines 1088 and 1089 of a disposable set of an APD system. In the illustrated embodiment, the tubing structure 1087 includes three branches: (a) a first branch 1087a connected to the first bellows 1081a, (b) a second branch 1087b connected to the second bellows 1081b, and (c) a third branch 1087c connected to the other fluid lines 1088 and 1089 of the disposable set (e.g., via a Y-connector 1084 or a T-connector). The branches 1087a-1087c can be connected to one another via a Y-connector 1085 or a T-connector in some embodiments. In other embodiments, the tubing structure 1087 and/or the damping device 1080 can be a single integral part such that the damping device 1080 does not include the Y-connector 1085 or a T-connector.

In operation, solution flowing through a disposable set containing the damping device 1080 can enter the third branch 1087c of the tubing structure 1087 of the damping device 1080 via the fluid line 1088, the fluid line 1089, and/or the Y-connector 1084. In turn, the solution can enter the first branch 1087a, the first bellows 1081a, the second branch 1087b, and/or the second bellows 1081b. As the solution enters the first bellows 1081a, the first bellows 1081a can absorb a percentage of amplitudes of positive-pressure pulsation amplitudes by expanding or deflect/deforming (i) outwards during positive pressure flow and (ii) against atmospheric or another pressure applied to the outside surface of the first bellows 1081a. As the first bellows 1081a is deflected outwards, a total volume of the first bellows 1081a increases, thereby reducing solution flow pressure. As a result, the damping device 1080 can reduce or dampen amplitudes of positive pressure pulses in the solution. The second bellows 1081b can operate in a similar manner.

In some embodiments, the damping device 1080 can reduce or dampen amplitudes of negative pressure pulses in solution flowing through the disposable set. For example, as solution enters the first bellows 1081a, the first bellows 1081a can absorb a percentage of amplitudes of negative-pressure pulsation amplitudes by contracting or deflecting deforming (i) inwards during negative pressure flow and (ii) away from atmospheric or another pressure applied to the outside surface of the first bellows 1081a. As the first bellows 1081a is deflected inwards, the total volume of the first bellows 1081a decreases, thereby increasing solution flow pressure. The second bellows 1081b can operate in a similar manner.

In some embodiments, one or more damping devices 1080 can be used in conjunction with (a) one or more damping devices 202 of FIGS. 2A-3, (b) one or more damping cassettes 750 of FIG. 7, and/or (c) one or more damping buffers 970 of FIG. 9. For example, a damping device 1080 can be positioned between (i) a pump and (ii) an inlet 214 (FIG. 2A) of a damping device 202. Additionally, or alternatively, a damping device 1080 can be positioned after an outlet 219 (FIG. 2A) of the damping device 202 and/or before the pump.

Figure 11:
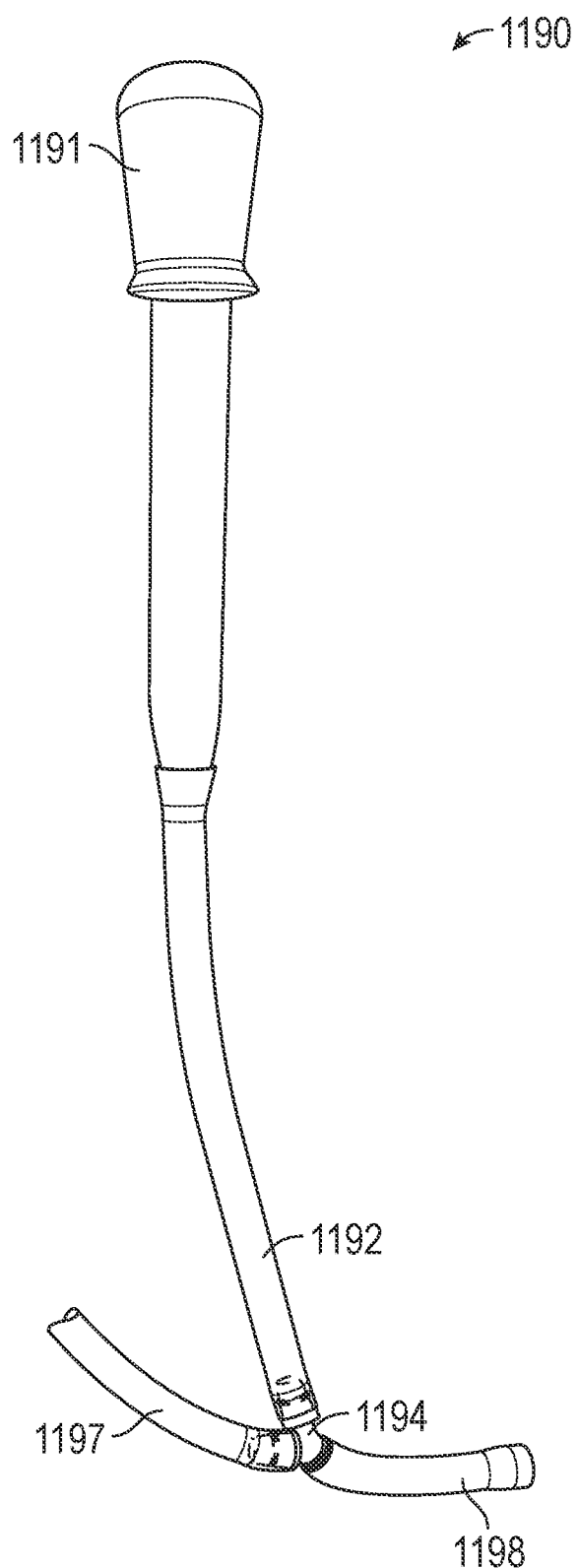
FIG. 11 is a partially schematic representation of yet another damping device configured in accordance with various embodiments of the present technology.

FIG. 11 is a partially schematic representation of another damping device 1190 configured in accordance with various embodiments of the present technology. The damping device 1190 includes a pipette bulb 1191 and a tubing structure 1192. The pipette bulb 1191 can be formed of a biocompatible material, such as a plastic, a polymer, or another suitable material. The biocompatible material can be flexible or semi-rigid.

The damping device 1190 can be operably connected to other fluid lines 1197 and 1198 of a disposable set (e.g., via a Y-connector 1194 or a T-connector). In operation, solution flowing through a disposable set containing the damping device 1190 can enter the tubing structure 1192 of the damping device 1190 via the fluid line 1197, the fluid line 1198, and/or the Y-connector 1194. In turn, the solution can enter the pipette bulb 1191. As the solution enters the pipette bulb 1191, the pipette bulb 1191 can absorb a percentage of amplitudes of positive-pressure pulsation amplitudes by expanding or deflecting/deforming (i) outwards during a positive pressure flow and (ii) against atmospheric or another pressure applied to the outside surface of the pipette bulb 1191. As the pipette bulb 1191 is deflected outwards, a total volume of the pipette bulb 1191 increases, thereby reducing solution flow pressure. As a result, the damping device 1190 can reduce or dampen amplitudes of positive pressure pulses in the solution.

In some embodiments, the damping device 1190 can reduce or dampen amplitudes of negative pressure pulses in solution flowing through the disposable set. For example, as solution enters the pipette bulb 1191, the pipette bulb 1191 can absorb a percentage of amplitudes of negative-pressure pulsation amplitudes by contracting or deflecting/deforming (i) inwards during negative pressure flow and (ii) away from atmospheric or another pressure applied to the outside surface of the pipette bulb 1191. As the pipette bulb 1191 is deflected inwards, the total volume of the pipette bulb 1191 decreases, thereby increasing solution flow pressure.

In some embodiments, one or more damping devices 1190 can be used in conjunction with (a) one or more damping devices 202 of FIGS. 2A-3, (b) one or more damping cassettes 750 of FIG. 7, (c) one or more damping buffers 970 of FIG. 9, and/or (d) one or more damping devices 1080 of FIG. 10. For example, a damping device 1190 can be positioned between (i) a pump and (ii) an inlet 214 (FIG. 2A) of a damping device 202. Additionally, or alternatively, a damping device 1190 can be positioned after an outlet 219 (FIG. 2A) of the damping device 202 and/or before the pump.

Figure 12A:
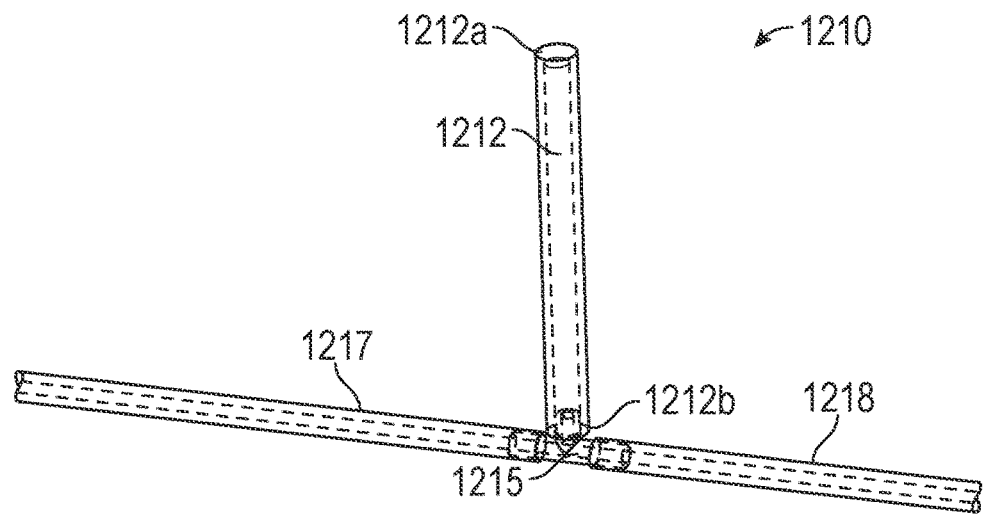
FIGS. 12A and 12B are partially schematic representations of still another damping device configured in accordance with various embodiments of the present technology.
Figure 12B:
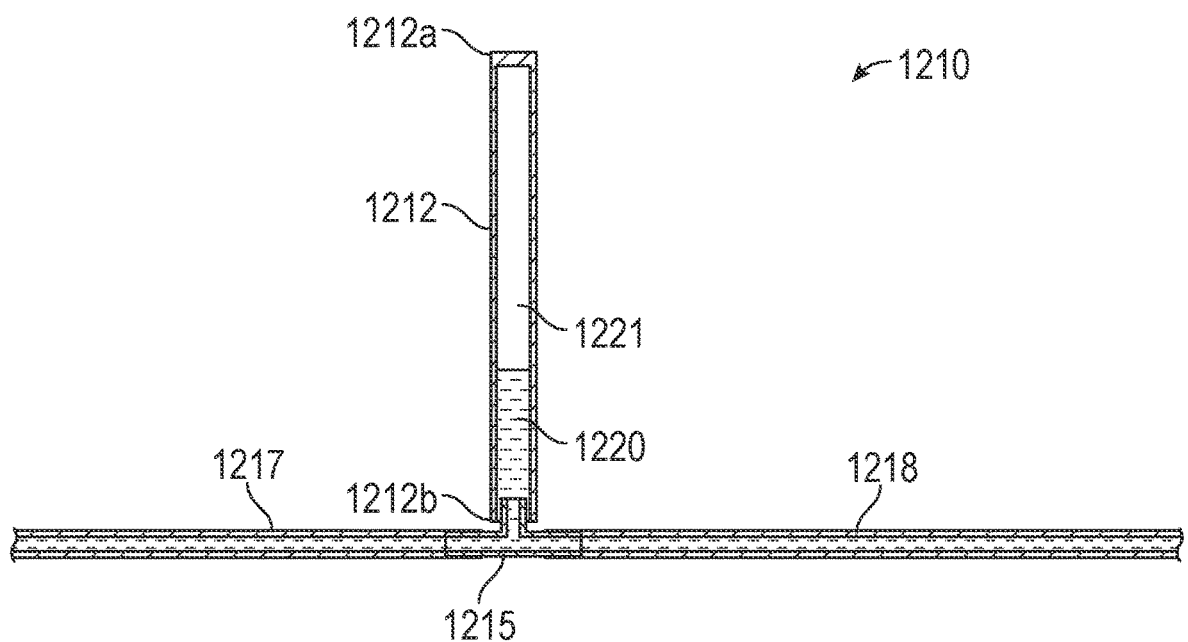

FIGS. 12A and 12B are partially schematic representations of another damping device 1210 configured in accordance with various embodiments of the present technology. As shown the damping device 1210 includes a tube 1212. The tube 1212 is capped at a first end 1212a and is operably connected to other fluid lines 1217 and 1218 of a disposable set at a second end 1212b (e.g., via a T-connector 1215 or a Y-connector).

Referring to FIG. 12B, the tube 1212 can be filled with a medium, such as sterilized air 1221. In some embodiments, the damping device 1210 can be installed (e.g., using the T-connector 1215) such that it is connected perpendicularly to the other fluid lines 1217 and 1218 and/or is positioned in a vertical orientation. This can increase the likelihood that the sterilized air 1221 (or another medium filling the tube 1212) remains in the tube 1212 and is not introduced into other portions of the disposable set and/or into a patient.

In operation, solution flowing through a disposable set containing the damping device 1210 can enter the tube 1212 via the fluid line 1217, the fluid line 1218, and/or the T-connector 1215. As the solution enters the tube 1212, the sterilized air 1221 can be compressed. For positive pressure flow, the level of solution in the tube 1212 can increase (e.g., due to a difference in compression ratios of the solution and the sterilized air 1221), which can further compress the sterilized air 1221 within the tube 1212. In turn, the damping device 1210 can absorb a percentage of positive-pressure pulsation amplitudes in the solution. For negative pressure flow, the level of solution in the tube 1212 can decrease (e.g., due to the difference in the compression ratios of the solution and the sterilized air 1221), which can cause the sterilized air 1221 to expand within the tube 1212. In turn, the damping device 1210 can absorb negative-pressure pulsation amplitudes in the solution. Therefore, the damping device 1210 can reduce or dampen amplitudes of positive- and/or negative-pressure pulsation amplitudes in solution at an output of the T-connector 1215 (e.g., at a branch of the T-connector 1215 connected to the other fluid line 1217 or connected to the other fluid line 1218).

In some embodiments, one or more damping devices 1210 can be used in conjunction with (a) one or more damping devices 202 of FIGS. 2A-3, (b) one or more damping cassettes 750 of FIG. 7, (c) one or more damping buffers 970 of FIG. 9, (d) one or more damping devices 1080 of FIG. 10, and/or (e) one or more damping devices 1190. For example, a damping device 1210 can be positioned between (i) a pump and (ii) an inlet 214 (FIG. 2A) of a damping device 202. Additionally, or alternatively, a damping device 1210 can be positioned after an outlet 219 (FIG. 2A) of the damping device 202 and/or before the pump.

C. EXAMPLES

Several aspects of the present technology are set forth in the following examples. Although several aspects of the present technology are set forth in examples specifically directed to systems, devices, and methods; any of these aspects of the present technology can similarly be set forth in examples directed to any of systems, devices, and methods in other embodiments.

1. A damping device for use with an automated peritoneal dialysis (APD) system, the damping device comprising:
   a body portion including a first side, a second side opposite the first side, an inlet, and a cavity fluidly coupled to the inlet, wherein the cavity is defined, at least in part, by a lumen in the body portion extending from the first side to the second side;
   a first membrane affixed to the first side of the body portion such that the first membrane hermetically seals the cavity at the first side of the body portion; and
   a second membrane affixed to the second side of the body portion such that the second membrane hermetically seals the cavity at the second side of the body portion.

2. The damping device of example 1 wherein:
   a first portion of the first membrane extends over the cavity at the first side of the body portion;
   a first portion of the second membrane extends over the cavity at the second side of the body portion; and
   the first portion of the first membrane or the first portion of the second membrane is configured to expand outwards away from or contract inwards towards a center of the cavity to increase or decrease, respectively, a volume of a chamber that is defined at least in part by the first portion of the first membrane, the first portion of the second membrane, and the cavity.

3. The damping device of example 1 or example 2 wherein:
   the body portion further includes a channel fluidly coupling the inlet to the cavity; and
   when the damping device is positioned in a vertical orientation:
      the inlet is positioned at a top portion of the damping device,
      the cavity is positioned at a bottom portion of the damping device, and
      the channel (i) extends vertically downward from the inlet and towards the cavity and (ii) terminates at a bottom portion of the cavity.

4. The damping device of any of examples 1-3 wherein the body portion further comprises a channel extending through the body portion, wherein the channel is fluidly isolated from the inlet and from the cavity within the damping device.

5. The damping device of any of examples 1-4 wherein:
   the cavity is a first cavity;
   the body portion further includes (i) a second cavity fluidly coupled to the inlet, and (ii) a channel positioned between and fluidly coupling the first cavity to the second cavity; and
   the first membrane hermetically seals the second cavity at the first side of the body portion.

6. The damping device of example 5 wherein:
   the lumen is a first lumen;
   the second cavity is defined at least in part by a second lumen in the body portion extending from the first side of the body portion to the second side; and
   the second membrane hermetically seals the second cavity at the second side of the body portion.

7. The damping device of example 5 or example 6 wherein, when the damping device is positioned in a vertical orientation, the first cavity is positioned below the second cavity such that fluid fills the first cavity before entering the second cavity.

8. The damping device of example 7 wherein the body portion farther includes an outlet positioned at a topmost portion of the second cavity.

9. The damping device of any of examples 1-8 wherein:
   the damping device further comprises a damping portion and a cassette portion;
   the damping portion includes the inlet and the cavity; and
   the damping portion and the cassette portion are integrated such that an outlet of the damping portion is an inlet of the cassette portion.

10. A disposable set of an automated peritoneal dialysis (APD) system, the disposable set comprising:
a cassette having a first inlet; and
a damping device including:
a body portion having—
a first side and a second side opposite the first side; and
a second inlet, an outlet, and a cavity fluidly coupling the second inlet to the outlet,
a first membrane affixed to the first side of the body portion and hermetically sealing the cavity at the first side of the body portion, and
a second membrane affixed to the second side of the body portion and hermetically sealing the cavity at the second side of the body portion; and
a fluid line fluidly coupling the outlet of the damping device to the first inlet of the cassette.

11. The disposable set of example 10 wherein:
a first portion of the first membrane extends over the cavity at the first side of the body portion;
a first portion of the second membrane extends over the cavity at the second side of the body portion; and
the first portion of the first membrane or the first portion of the second membrane is configured to deflect outwards away from or deflect inwards towards a center of the cavity to increase or decrease, respectively, a volume of a chamber that is defined at least in part by the first portion of the first membrane, the first portion of the second membrane, and the cavity.

12. The disposable set of example 10 or example 11 wherein:
the cavity is a first cavity;
the body portion of the damping device further includes a second cavity fluidly coupling the second inlet to the outlet;
the first membrane hermetically seals the second cavity at the first side of the body portion; and
the second membrane hermetically seals the second cavity at the second side of the body portion.

13. The disposable set of example 12 wherein, when the damping device is positioned in a vertical orientation, the first cavity is positioned below the second cavity such that fluid received at the second inlet fills the first cavity before entering the second cavity and before exiting the outlet.

14. The disposable set of any of examples 10-13 wherein:
the damping device is a first damping device; and
the disposable set further comprises one or more damping devices fluidly coupled to the second inlet of the first damping device.

15. The disposable set of example 14 wherein a damping device of the one or more damping devices includes:
a first bellows,
a second bellows, and
a tubing structure fluidly coupling the first and second bellows to a fluid line that is fluidly coupled to the second inlet of the first damping device.

16. The disposable set of example 14 or example 15 wherein a damping device of the one or more damping devices includes:
a pipette bulb; and
tubing fluidly coupling the pipette bulb to a fluid line that is fluidly coupled to the second inlet of the first damping device.

17. The disposable set of any of examples 14-16 wherein:
a damping device of the one or more damping devices includes a tube structure having a capped first end and a second end connected to a fluid line that is fluidly coupled to the second inlet of the first damping device; and
the tube structure is configured to be filled with sterilized air.

18. A method of operating a damping device, the method comprising:
receiving a solution at an inlet of a body portion of the damping device;
directing the solution to a bottom portion of a cavity of the body portion, wherein the cavity is hermetically sealed (a) at a first side of the body portion via a first membrane of the damping device affixed to the first side of the body portion and (b) at a second side of the body portion via a second membrane of the damping device affixed to the second side of the body portion, wherein the second side is opposite the first side; and
absorbing a percentage of pressure pulsation amplitudes in the solution by deflecting or retracting (i) a first portion of the first membrane or (ii) a first portion of the second membrane away from or towards, respectively, a center of the cavity,
wherein the first portion of the first membrane covers the cavity at the first side of the body portion, and
wherein the first portion of the second membrane covers the cavity at the second side of the body portion.

19. The method of example 18, further comprising exposing (a) a surface of the first portion of the first membrane that is opposite the body portion to atmospheric pressure while the solution is within the cavity or (b) a surface of the second portion of the second membrane that is opposite the body portion to the atmospheric pressure while the solution is within the cavity.

20. The method of example 18 or example 19 wherein:
the cavity is a first cavity and the percentage of the pressure pulsation amplitudes is a first percentage; and
the method further comprises:
directing the solution into a second cavity of the body portion, wherein the second cavity is hermetically sealed (a) at the first side of the body portion via the first membrane and (b) at the second side of the body portion via the second membrane,
absorbing a second percentage of the pressure pulsation amplitudes in the solution by deflecting or retracting (i) a second portion of the first membrane or (ii) a second portion of the second membrane away from or towards, respectively, a center of the second cavity,
wherein the second portion of the first membrane covers the second cavity at the first side of the body portion, and
wherein the second portion of the second membrane covers the second cavity at the second side of the body portion, and
outputting the solution via an outlet of the damping device positioned at a top portion of the second cavity.

21. An automated peritoneal dialysis (APD) system, comprising:
a pump; and
a disposable set, the disposable set including a damping device having an inlet, an outlet, and a single fluid chamber fluidly coupled to the inlet and to the outlet, wherein:
the inlet is operably connected to the pump, and
the fluid chamber is defined at least in part by (i) a lumen extending from a first side of a body portion of the damping device to a second side of the body portion opposite the first side, (ii) a first membrane affixed to the first side of the body portion and hermetically sealing the lumen at the first side, and (iii) a second membrane affixed to the second side of the body portion and hermetically sealing the lumen at the second side.

22. The APD system of example 21, further comprising a cassette, wherein:
the cassette has an inlet fluidly coupled to the outlet of the damping device; or
the cassette is integrated with the damping device.

23. The APD system of example 21 or example 22, wherein the damping device is a first damping device, wherein the APD system further comprises a second damping device positioned between the pump and the first damping device, and further wherein:
the second damping device includes a first bellows and a second bellows fluidly coupled to the inlet of the damping device;
the second damping device includes a pipette bulb fluidly coupled to the inlet of the damping device; or
the second damping device includes a tube fluidly coupled to the inlet of the damping device, wherein the tube has a capped end and is configured to store sterilized air.

24. A damping device, comprising:
a first bellows;
a second bellows; and
a tubing structure (i) fluidly coupling the first bellows to the second bellows and (ii) configured to fluidly couple the first and second bellows to a fluid line that is operably connected to a pump.

25. A damping device, comprising:
a pipette bulb; and
a tube (i) fluidly coupled to the pipette bulb and (ii) configured to fluidly couple the pipette bulb to a fluid line that is operably connected to a pump.

26. A damping device, comprising a tube having a capped first end and an open second end, wherein the second end is configured to be fluidly coupled to a fluid line that is operably connected to a pump, and wherein the tube is configured to store sterilized air.

C. CONCLUSION

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any materials incorporated herein by reference conflict with the present disclosure, the present disclosure controls. Where the context permits, singular or plural terms can also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and both A and B. Where the context permits, singular or plural terms can also include the plural or singular term, respectively. Additionally, the terms "comprising," "including," "having" and "with" are used throughout to mean including at least the recited feature(s) such that any greater number of the same feature and/or additional types of other features are not precluded.

Furthermore, as used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. Moreover, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments can perform steps in a different order. As another example, various components of the technology can be further divided into subcomponents, and/or various components and/or functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology.

It should also be noted that other embodiments in addition to those disclosed herein are within the scope of the present technology. For example, embodiments of the present technology can have different configurations, components, and/or procedures in addition to those shown or described herein. Moreover, a person of ordinary skill in the art will understand that these and other embodiments can be without several of the configurations, components, and/or procedures shown or described herein without deviating from the present technology. Accordingly, the disclosure and associated technology can encompass other embodiments not expressly shown or described herein.

What is claimed is:

1. A damping device for use with an automated peritoneal dialysis (APD) system, the damping device comprising:
a body portion including a first side, a second side opposite the first side, an inlet, a first cavity fluidly coupled to the inlet, a second cavity fluidly coupled to the inlet, a channel positioned between and fluidly coupling the first cavity to the second cavity, wherein the first cavity is defined, at least in part, by a lumen in the body portion extending from the first side to the second side;
a first membrane affixed to the first side of the body portion such that the first membrane hermetically seals the first cavity at the first side of the body portion and the second cavity at the first side of the body portion; and a second membrane affixed to the second side of the body portion such that the second membrane hermetically seals the first cavity at the second side of the body portion.

2. The damping device of claim 1, wherein:
a first portion of the first membrane extends over the first cavity at the first side of the body portion;
a first portion of the second membrane extends over the first cavity at the second side of the body portion; and
the first portion of the first membrane or the first portion of the second membrane is configured to expand outwards away from or contract inwards towards a center of the first cavity to increase or decrease, respectively, a volume of a chamber that is defined at least in part by the first portion of the first membrane, the first portion of the second membrane, and the first cavity.

3. The damping device of claim 1, wherein:
the body portion further includes a channel fluidly coupling the inlet to the first cavity; and
when the damping device is positioned in a vertical orientation:
the inlet is positioned at a top portion of the damping device,
the first cavity is positioned at a bottom portion of the damping device, and
the channel (i) extends vertically downward from the inlet and towards the first cavity and (ii) terminates at a bottom portion of the first cavity.

4. The damping device of claim 1, wherein the body portion further comprises a channel extending through the body portion, and wherein the channel is fluidly isolated from the inlet and from the first cavity within the damping device.

5. The damping device of claim 1, wherein:
the lumen is a first lumen;
the second cavity is defined at least in part by a second lumen in the body portion extending from the first side of the body portion to the second side; and
the second membrane hermetically seals the second cavity at the second side of the body portion.

6. The damping device of claim 1, wherein when the damping device is positioned in a vertical orientation, the first cavity is positioned below the second cavity such that fluid fills the first cavity before entering the second cavity.

7. The damping device of claim 6, wherein the body portion further includes an outlet positioned at a topmost portion of the second cavity.

8. The damping device of claim 1, wherein:
the damping device further comprises a damping portion and a cassette portion;
the damping portion includes the inlet and the first cavity; and
the damping portion and the cassette portion are integrated such that an outlet of the damping portion is an inlet of the cassette portion.

9. A method of operating the damping device of claim 1, the method comprising:
receiving a solution at the inlet;
directing the solution to a bottom portion of the first cavity, wherein the first cavity is hermetically sealed (a) at the first side of the body portion via the first membrane of the damping device affixed to the first side of the body portion and (b) at the second side of the body portion via the second membrane of the damping device affixed to the second side of the body portion;
absorbing a first percentage of pressure pulsation amplitudes in the solution by deflecting or retracting (i) a first portion of the first membrane or (ii) a first portion of the second membrane away from or towards, respectively, a center of the first cavity, wherein the first portion of the first membrane covers the first cavity at the first side of the body portion, and wherein the first portion of the second membrane covers the first cavity at the second side of the body portion;
directing the solution into the second cavity of the body portion, wherein the second cavity is hermetically sealed (a) at the first side of the body portion via the first membrane and (b) at the second side of the body portion via the second membrane;
absorbing a second percentage of the pressure pulsation amplitudes in the solution by deflecting or retracting (i) a second portion of the first membrane; or (ii) a second portion of the second membrane away from or towards, respectively, a center of the second cavity, wherein the second portion of the first membrane covers the second cavity at the first side of the body portion, and wherein the second portion of the second membrane covers the second cavity at the second side of the body portion; and
outputting the solution via an outlet of the damping device positioned at a top portion of the second cavity.

10. The method of claim 9, further comprising exposing (a) a surface of the first portion of the first membrane that is opposite the body portion to atmospheric pressure while the solution is within the first cavity; or (b) a surface of the second portion of the second membrane that is opposite the body portion to the atmospheric pressure while the solution is within the second cavity.

11. A method of operating a damping device, the method comprising:
receiving a solution at an inlet of a body portion of the damping device;
directing the solution to a bottom portion of a first cavity of the body portion, wherein the first cavity is hermetically sealed (a) at a first side of the body portion via a first membrane of the damping device affixed to the first side of the body portion and (b) at a second side of the body portion via a second membrane of the damping device affixed to the second side of the body portion, wherein the second side is opposite the first side;
absorbing a first percentage of pressure pulsation amplitudes in the solution by deflecting or retracting (i) a first portion of the first membrane or (ii) a first portion of the second membrane away from or towards, respectively, a center of the first cavity, wherein the first portion of the first membrane covers the first cavity at the first side of the body portion, and wherein the first portion of the second membrane covers the first cavity at the second side of the body portion;
directing the solution into a second cavity of the body portion, wherein the second cavity is hermetically sealed (a) at the first side of the body portion via the first membrane and (b) at the second side of the body portion via the second membrane;
absorbing a second percentage of the pressure pulsation amplitudes in the solution by deflecting or retracting (i) a second portion of the first membrane; or (ii) a second portion of the second membrane away from or towards, respectively, a center of the second cavity, wherein the second portion of the first membrane covers the second cavity at the first side of the body portion, and wherein the second portion of the second membrane covers the second cavity at the second side of the body portion; and outputting the solution via an outlet of the damping device positioned at a top portion of the second cavity.

12. The method of claim 11, further comprising exposing (a) a surface of the first portion of the first membrane that is opposite the body portion to atmospheric pressure while the solution is within the first cavity; or (b) a surface of the second portion of the second membrane that is opposite the body portion to the atmospheric pressure while the solution is within the second cavity.

\* \* \* \* \*